United States Patent [19]

Cooper et al.

[11] Patent Number: 4,996,662

[45] Date of Patent: Feb. 26, 1991

[54] METHOD FOR GENERATING DOCUMENT USING TABLES STORING POINTERS AND INDEXES

[75] Inventors: James L. Cooper; Marc D. San Soucie, both of Tyngsboro, Mass.

[73] Assignee: Wang Laboratories, Inc., Lowell, Mass.

[21] Appl. No.: 538,644

[22] Filed: Oct. 3, 1983

[51] Int. Cl.$^5$ ............................................. G06F 15/00
[52] U.S. Cl. ............................... 364/900; 364/943.43; 364/943.44; 364/963.3
[58] Field of Search ....................... 364/200, 900, 300; 340/734, 735, 790, 750, 799, 747, 732; 276/1, 8, 28; 283/1 R, 67, 66 R; 235/432, 475; 400/76, 279

[56] References Cited

U.S. PATENT DOCUMENTS

| | | | |
|---|---|---|---|
| 3,930,237 | 12/1975 | Villers | 364/900 |
| 4,068,300 | 1/1978 | Bachman | 364/200 |
| 4,084,228 | 4/1978 | Dufond et al. | 364/200 |
| 4,451,900 | 5/1984 | Mayer et al. | 364/900 |
| 4,454,576 | 6/1984 | McInroy et al. | 364/200 |
| 4,464,730 | 8/1984 | Lawrence et al. | 364/200 |
| 4,480,308 | 10/1984 | Grape et al. | 364/200 |
| 4,497,039 | 1/1985 | Kitakami et al. | 364/900 |
| 4,513,391 | 4/1985 | Maddock | 364/200 |
| 4,539,653 | 9/1985 | Bartlett et al. | 364/200 |
| 4,553,860 | 11/1985 | Imaizumi et al. | 364/900 X |

OTHER PUBLICATIONS

Database Processing: Fundamentals, Design, Implementation, 2nd ed., David M. Kroenke; Science Research Associates, Inc., 1983, pp. 83–90, 219–222.
Effective Data Database Design, William H. Inbon, Prentice-Hall, Inc., 1982.
IBM Tech. Discl. Bull., vol. 21, No. 11, Apr. 1979; System for Simplified Form Fill-In Using CRT Display, by R. J. Gerlach et al., pp. 4323–4329.
Data Base Architecture, Ivan Flores, Van Nostrand Reinhold Co., 1982, pp. 48–51, 344–353.
Applicant's Disclosure of his Proprietary Prior-Art Document Structure.

*Primary Examiner*—Thomas C. Lee
*Attorney, Agent, or Firm*—Michael H. Shanahan; Scott K. Peterson

[57] ABSTRACT

A document processing system including a control structure having separated supervisory and document functions. The document functions, including a document buffer and document access control means are the sole means for accessing documents and the document function routines are selected from predetermined library of such routines. The system includes a flexible, expandable document structure incorporating information item blocks and indexing blocks related through pointers and means for applying visual and informational attributes to document text.

9 Claims, No Drawings

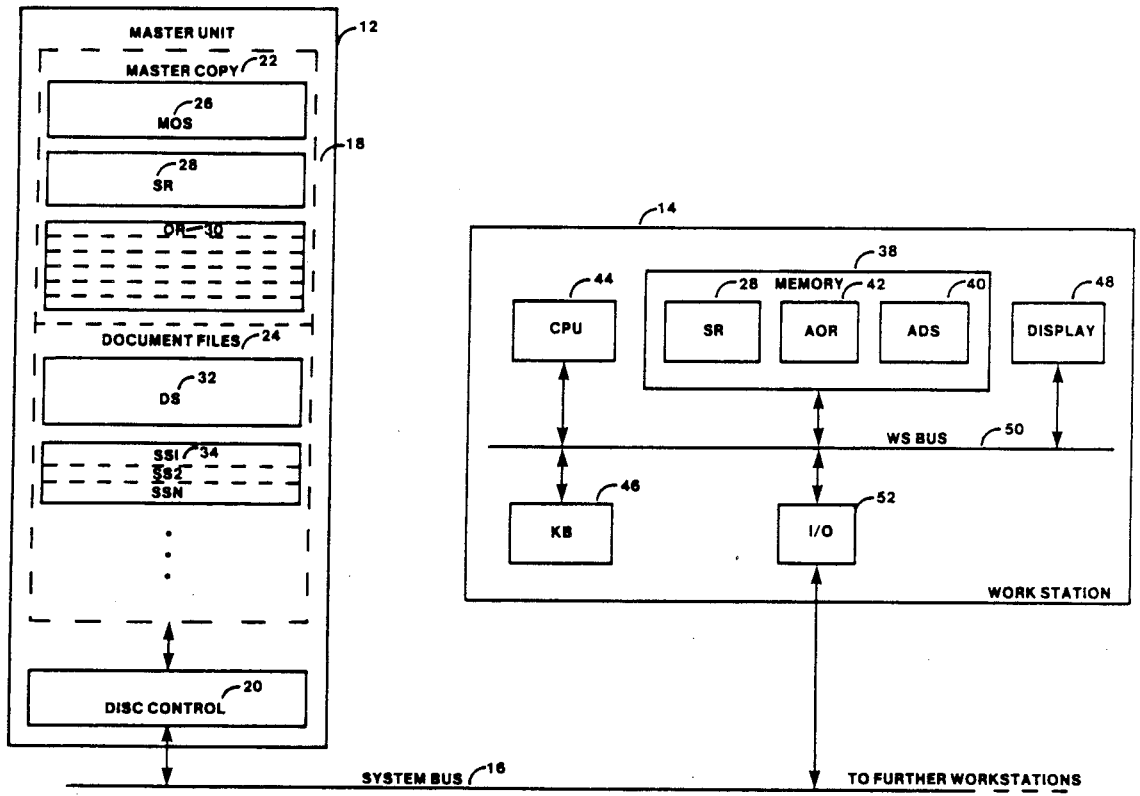

SYSTEM BLOCK DIAGRAM

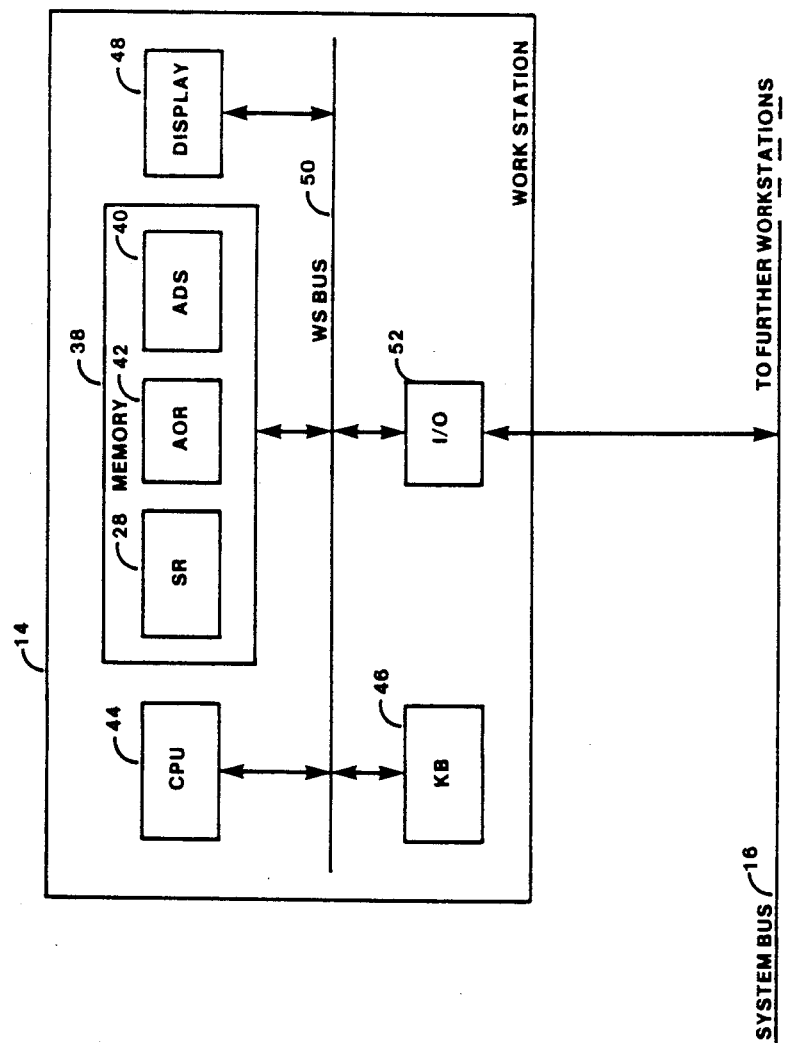
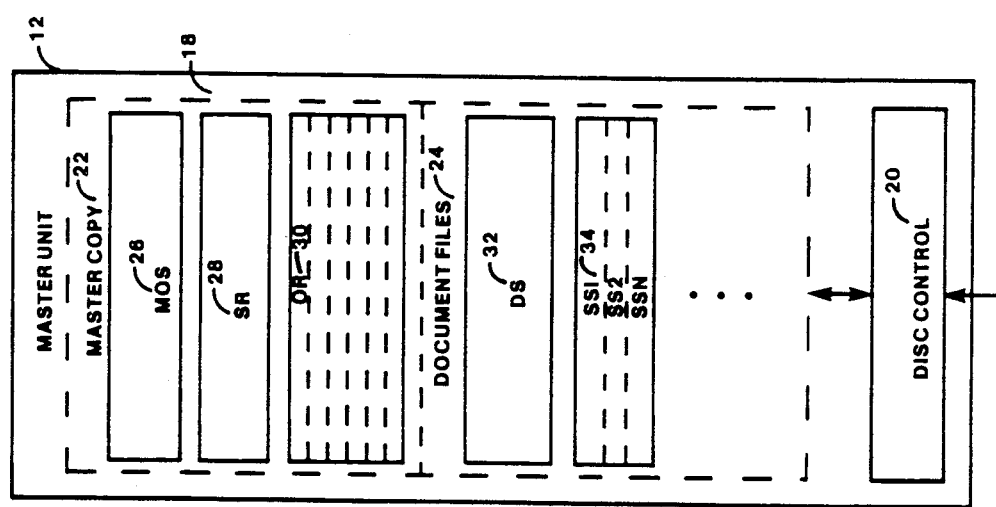
FIG. 1
SYSTEM BLOCK DIAGRAM

SYSTEM CONTROL STRUCTURE

FIG. 3. CONTROL AND DATA STRUCTURE

DOCUMENT STRUCTURE

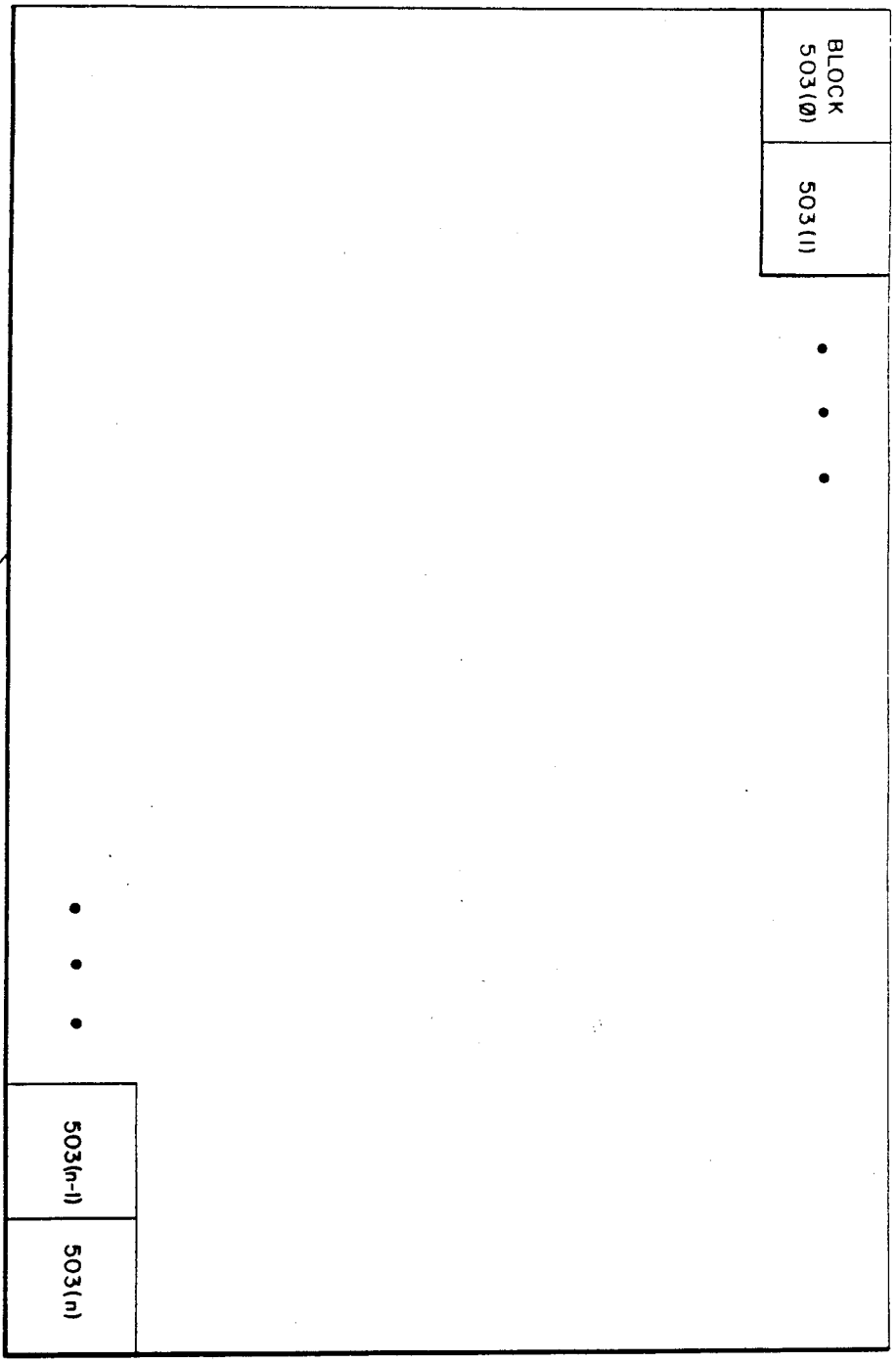
FIG. 5 STRUCTURE OF A DOCUMENT FILE 24

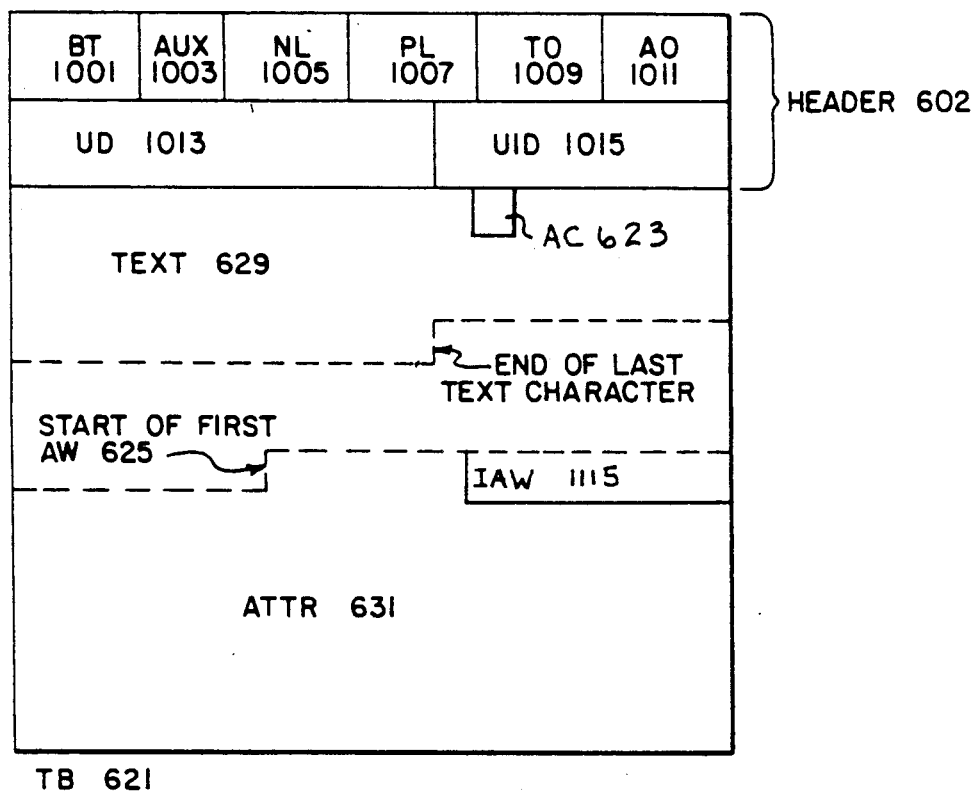
FIG. 6   IIB 86 DETAIL

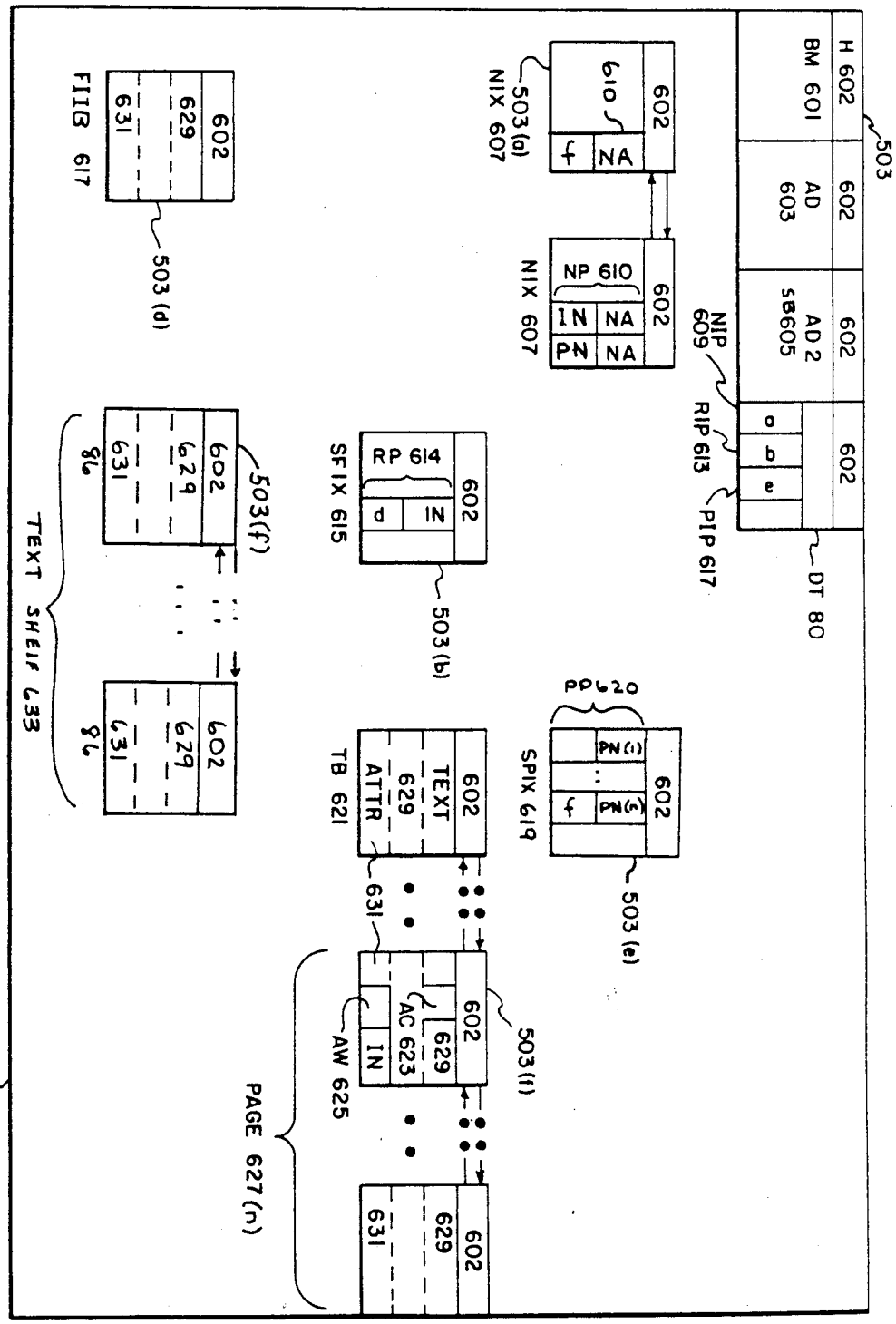
FIG. 7 DETAIL OF THE DOCUMENT STRUCTURE

FIG. 8 DETAIL OF ATTRIBUTE WORDS 625

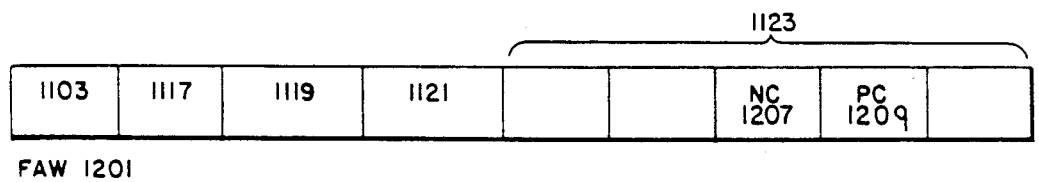
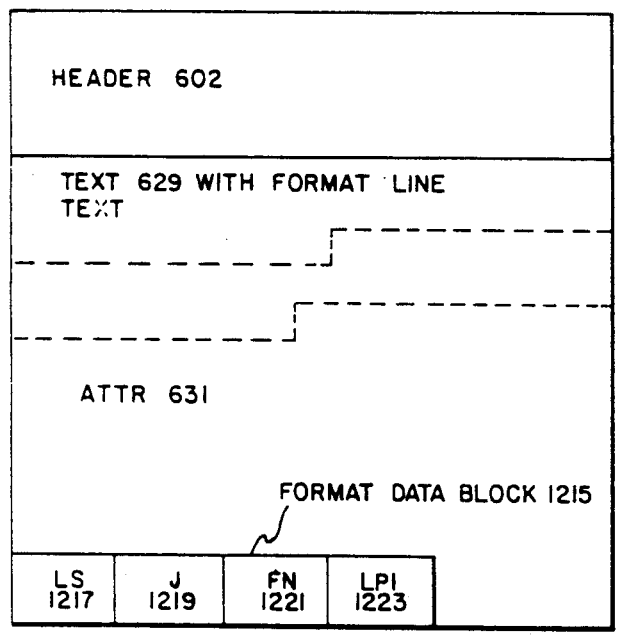
FIG. 9 FORMAT ATTRIBUTE WORD AND FIIB

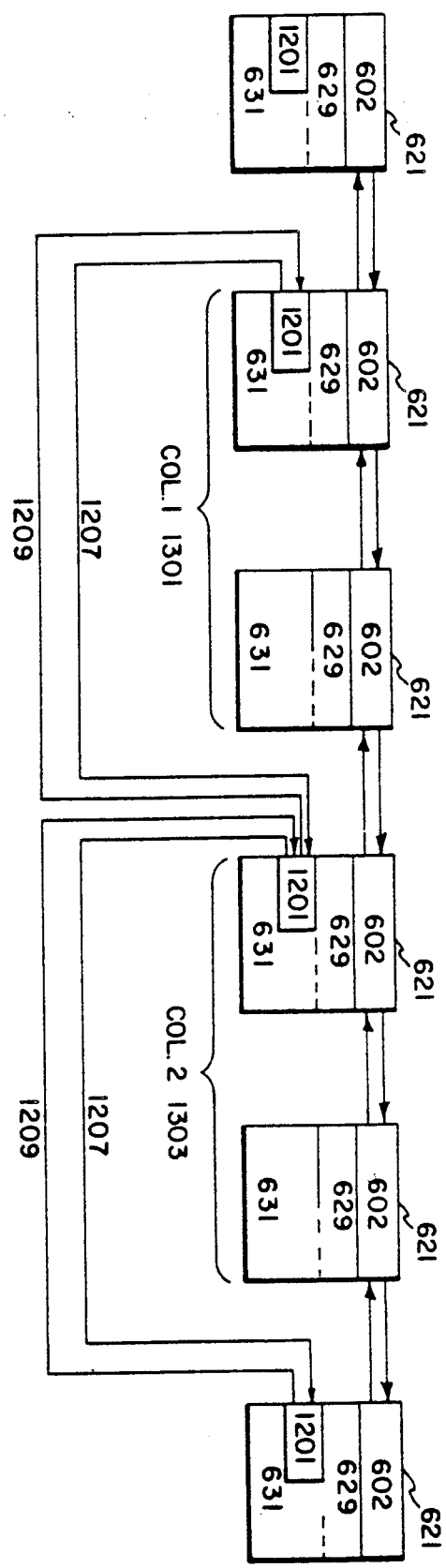
FIG. 10 COLUMNS IN A CHAIN OF TBS 621

METHOD FOR GENERATING DOCUMENT USING TABLES STORING POINTERS AND INDEXES

CROSS REFERENCES TO RELATED APPLICATIONS

The present application is a parent of a continuation-in-part application, U.S. Ser. No. 656,831, filed Oct. 2, 1984, titled DATA STRUCTURE FOR A DOCUMENT PROCESSING SYSTEM and having the same inventors as the present application, now abandoned.

BACKGROUND OF THE INVENTION

1. Field of the Invention

The present invention relates to a control and data structure for a data processing system and, more particularly, for the type of system referred to as a word processing or office automation system.

2. Description of the Prior Art

Word processing and office systems are primarily concerned with the generation, editing and, for example, printing and filing, of documents. Such systems usually fall into two general classes, centralized and distributed.

A centralized system may include a central processor or computer and one orlmore attached terminals. Data, that is, documents of various types, and routines for operating upon the documents are stored in the central processor memory. Essentially all operations upon the documents are executed in the central processor, with the terminals operating as input and output devices for the central processor.

Distributed systems are based upon a network of small interactive units, each having memory and processing capabilities. A distributed system may include a central, shared memory unit for storing routines and data and a number of independently operating terminals. Each terminal may include a memory for storing currently active segments of routines and data and a processor for operating upon the currently active segments. Routine and data segments are transferred between the memory unit and the terminals as required by the operations of the terminals. An exemplary distributed system is shown in U.S. Pat. No. 4,145,739, issued March 20, 1979 and assigned to Wang Laboratories, Inc., the assignee of the present invention.

In any system, whether previously existing or newly designed, the memory and processing capabilities of the system are usually determined and limited by economic and practical considerations. As a result of such limitations, a recurring problem in word processing and office systems is that of implementing increasingly more sophisticated and powerful document processing systems requiring increasingly greater memory and processing capabilities within currently available system limitations. The distributed system described in U.S. Pat. No. 4,145,739 was developed in response to this problem and provided a powerful word processing capability in a system having minimal memory and processing capabilities.

The problem described above may be regarded as being comprised of two related problem areas. The first is the system control structure, that is, a structure which includes and interrelates routines for controlling the operation of the system and routines for generating and manipulating documents. Because of the above described constraints, system control structures of the prior art have either required the use of a large and powerful computer or, in smaller systems, have only allowed document processing systems of limited capabilities. The problem is essentially one of implementing the power and flexibility of a large processor and memory system within a system having limited processing and memory capacity.

A related problem is, that due to the same constraints on memory and processing capability, the control and document processing systems of the prior art have been constructed in such a manner that the system cannot be easily modified. Such modifications frequently result in severe operational problems due to unexpected or unforseen interactions between the modified and unmodified portions of the systems.

The second problem area is that of providing a document structure having the flexibility and expansion capability to allow the generation and manipulation of very complex documents within the above described constraints on memory and processing capability.

SUMMARY OF THE INVENTION

The present invention relates to a document processing system and, in particular, to a control and document structure for implementing a powerful and flexible document processing system within a system having limited memory and processor capabilities. The system architecture includes a control structure providing supervisory routines for controlling supervisory functions of the system and document manipulation routines for operating upon said documents. The document manipulation routines are selected from a library of such routines and, together with an associated document buffer and document access control means, comprise the sole means of accessing a document and a clear and distinct interface between system supervisory functions and document functions. The document structure of the present invention is flexible and expandable to allow the generation of complex documents within the minimum required memory space and includes information item blocks for containing the text and data of a document and an adaptive indexing structure for accessing all information item blocks. The document structure incorporates means for referencing visual, descriptive and informational attributes of document text and data and allows the use of names in reference to document text and attributes.

It is thus advantageous to incorporate the present invention into a document processing system in that the present invention allows the creation of a powerful and flexible document processing system in a system having limited memory and processor capability. The present invention is further advantageous in that the document structure of the present invention is flexible and expandable to allow the creation of very complex documents while requiring the minimum memory capacity.

It is thus an object of the present invention to provide an improved document processing system.

It is another obJect of the present invention to provide an improved control structure for a document processing system.

It is yet another object of the present invention to provide a document processing system control structure providing a clear interface between supervisory and document functions so that portions of the control structure may be modified at will with minimum conflict with unmodified portions of the control structure.

It is still another object of the present invention to provide a control structure providing controlled access to the text and data of documents.

It is another object of the present invention to provide a flexible and expandable document structure capable of creating complex documents while requiring a minimum of memory capacity.

It is still another object of the present invention to provide a document structure allowing powerful and complex editing capabilities.

Other objects and advantages of the present invention will be understood by those of ordinary skill in the art after referring to the detailed description of a preferred embodiment and the drawings, wherein:

BRIEF DESCRIPTION OF THE DRAWINGS

FIG. 1 is a bock diagram representation of a system incorporating the present invention;

FIG. 5 is a block diagram of a document file 24;

FIG. 6 is a detail of a text block 621;

FIG. 7 is a detail of the document structure of FIG. 4

FIG. 8 is a detail of attribute words 625;

FIG. 9 is a detail of format attribute words and format reference blocks; and

FIG. 10 is a detail of columns in a chain of text blocks 621.

DESCRIPTION OF A PREFERRED EMBODIMENT

The following discussion presents the structure and operation of a document processing system incorporating the present invention. The system and system control and document structures will be described first at a block diagram level, followed by more detailed descriptions of these structures and the document structure implemented therein.

Figure 2:
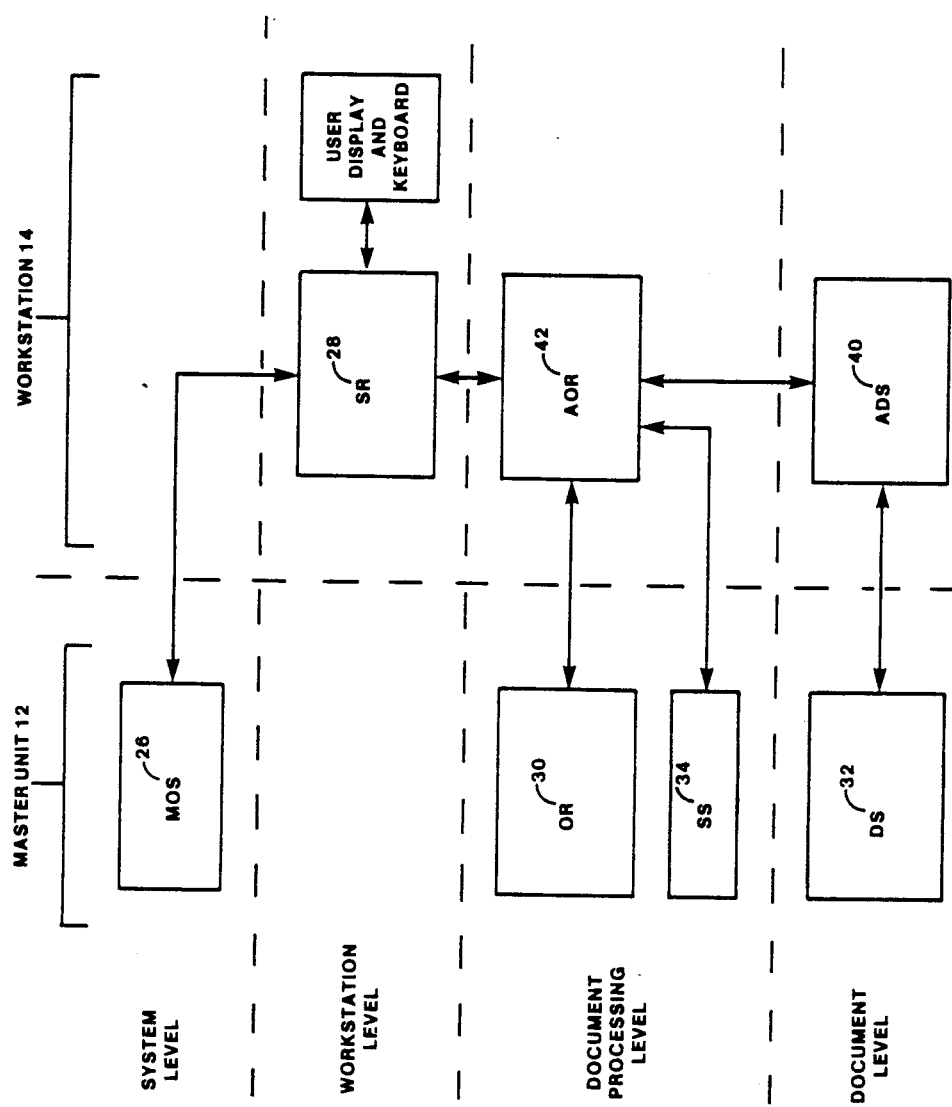
FIG. 2 is a block diagram representation of the control and document structures of the system of FIG. 1.

1. System Block Diagram Structure and Operation (FIGS. 1 and 2)

Referring to FIG. 1, a block diagram of a distributed System 10 incorporating the present invention is shown. System 10 is similar in structure and overall operation to the data processing system described in U.S. Pat. No. 4,145,739, previously referenced and incorporated herein by reference.

Major elements of System 10 include a Master Unit 12 and one or more Workstations 14 interconnected through System Bus 16. As will be described further below, Master Unit 12 is a system memory and stores a master copy of all routines for controlling operation of the system, including document manipulation operations executed by Workstations 14. Master Unit 12 also stores copies of all segments, active and inactive, of all documents being operated upon by Workstations 14.

Currently active segments of the documents being operated upon by Workstations 14, the document manipulation routines necessary to operate upon the active document segments and the routines necessary to control operation of Workstations 14 reside as described below, in Workstations 14. The currently active document segments and routines residing in Workstations 14 are, as described further below, subsets of the master copies of the documents and routines residing in Master Unit 12. Document segments and workstation control and document manipulation routines are transferred between Master Unit 12 and Workstations 14 through System Bus 16 as required by the operations of Workstations 14.

A. Master Unit 12 (FIG. 1)

Master Unit 12 is, in the present embodiment, a disc drive memory including a Disc 18 and a Master Disc Controller 20. Master Disc Controller 20 is a microprocessor controlled unit operating under control of routines stored on Disc 18 for controlling transfer of information between Disc 18 and Workstations 14.

Referring to Disc 18, the information residing thereon includes a Master Copy 22 of all routines required to control all operations of System 10, including document manipulation operations, and one or more Document Files 24, which include copies of all segments, active and inactive, of all documents residing in System 10. The routines residing in Master Copy 22 include Master Operating System (MOS) 26, Supervisor Routines (SR) 28 and Overlay Routines (OR) 30. MOS 26 includes the routines controlling overall operation of System 10, for example, the operation of Disc Control 20 and the transfer of information between Master Unit 12 and Workstations 14. SR 28 includes the routines, described further below, for controlling the internal operations of Workstations 14 and essentially comprise an internal operating system for Workstations 14. OR 30, in turn, includes the document manipulation routines, that is, routines executed by Workstations 14 in directly operating upon documents.

Each Document File 24 residing on Disc 18 will include a master copy of a corresponding Document Structure DS) 32 of a document residing in System 10. If the document is currently being operated upon in a Workstation 14, a copy of the currently active segments of the document s DS 32 will reside in the Workstation 14 and there will be transfers of document segments between the DS 32 and Workstation 14 as the document is operated upon. Each Document File 24 may also include one or more Saved States (SS) 34. As will be described further below, an SS 34 results when an operation being performed upon a document is interrupted to execute a different operation before the interrupted operation is completed. In such cases, the state of of operation of the Workstation 14, that is, information completely defining the interrupted operation, including the interrupted routine, is saved by being copied as an SS 34 to the corresponding Document File 24.

B. Workstation 14 (FIG. 1)

As shown in FIG. 1, Workstation 14 includes Workstation Memory (WSM) 38 for storing currently active document segments (ADS) 40 of a DS 32, currently active segments (AOR) 42 of OR 30, and the workstation copy of SR 28. As described further below, ADS 38 and AOR 40 are subsets, or working copies, of portions of DS 32 and OR 30. Workstation 14 further includes Workstation Central Processor Unit (CPU) for operating upon ADS 40 under direction of AOR 40 and SR 28, a Keyboard (KB) 46 to allow a workstation user to enter data (text) and document manipulation commands, and a Display 48 for displaying the results of user and system operations. The elements of Workstation 14 are interconnected through Workstation (WS) Bus 50 and information is conducted between WS Bus 50 and the elements of Workstation 14 and System Bus 16 through Input/Output (I/0) 52.

As will be described further below, a primary visible focus of the operation of System 10 is the interactive operation between System 10 and a user, through KB 46 and Display 48, in the generation and manipulation of documents. System 10 may be regarded, therefore, and in certain aspects, as a keystroke processing system. That is, a user enters data (text) and text/document manipulation commands by means of keystrokes through KB 46. Workstation 14 responds by executing in CPU 44 the appropriate routines selected from AOR 42 and SR 28, modifies the contents of ADS 40 as determined by the executed routines, and displays the results of the user actions through Display 48.

C. System 10 Control and Document Structure (FIG. 2)

Referring to FIG. 2, a diagrammic overview of the System 10 control and document structure is shown. As has been previously described, the major elements of System 10's control and document structure include Master Operating System (MOS) 26, Supervisor Routines (SR) 28, Overlay Routines (OR) 30 and Active Overlay Routines 42, and Document Structures (DS) 32 and Active Document Structures (ADS) 40.

The hierarchical structure of these elements is illustrated in FIG. 2, as are their locations and primary areas of operation in System 10. As will be described further below, MOS 26 primarily resides in Master UNit 12 and comprises an operating system for all of System 10 while SR 28 resides in Workstation 14 and comprises a workstation operating system OR 30, the document manipulation routines comprises the actual document processing system with a time varying subset of OR 30 AOR 42, residing in Workstation 14. DS 32 contains the actual document, with a time varying subset of DS 32, ADS 40, residing in Workstation 14.

a. Master Operating System 26

As previously described, MOS 26 controls the overall operation of System 10 and is a resource shared by Master Unit 12 and all Workstations 14 in System 10. MOS 26 is effectively an operating system for System 10 and primarily resides in Master Unit 12. MOS 26, for example, controls the transfer of information between Master Unit 12 and Workstations 14.

b. Service Routines 28

As indicated in FIG. 2, a copy of SR 28 resides in each Workstation 14 and essentially operates as a workstation operating system. In contrast to MOS 26, which resides in Master Unit 12, and to OR 30/AOR 42, described below, SR 28 is resident in Workstation 14 at all times while Workstation 14 is operating. SR 28 interacts directly with MOS 26, the user and AOR 42 and interacts indirectly with ADS 40, through AOR 42, and with DS 32 and OR 30 through MOS 26. SR 28 is thereby effectively the central, or nodal, element through which all elements of System 10 interact and through which all operations are accomplished.

In interacting with MOS 6, for example, SR 28 in a Workstation 14 manages the available memory space in the workstations WSM 38 and monitors the selection of routines to be executed by the workstation. If, for example, it becomes necessary to free space in WSM 38 for new active document segments in ADS 40 or if a routine is selected which does not presently reside in WSM 38. SR 28 will generate a request for an appropriate transfer of information between Workstation 14 and Master Unit 12. SR 28 will place that request in I/0 52 and the request will subsequently be read by MOS 26 in a workstation polling procedure. MOS 26 will respond to the request by performing the information transfer, that is, by transferring the necessary document segments, routines or saved state information between Disc 18 and WSM 38 of the Workstation 14. This interaction between SR 28 and MOS 26 is an example of the indirect interaction between SR 28 and OR 30 and DS 32. That is, SR 28 interacts with MOS 26 to operate upon ADS 40 and AOR 42 which, in turn, are subsets of DS 32 and OR 30.

As previously described, System 10 may be regarded, in certain aspects, as a keystroke processing system, that is, accepting text and document manipulation commands from a user through keystrokes through KB 46, performing the indicated operation upon a document, and displaying the results of the operations to the user through Display 48.

To accomplish this function. SR 28 interacts with the user through KB 46 and Display 48 and with the document through document manipulation routines 0R 30/AOR 42. As described further below, SR 28 accepts keystroke inputs from KB 46, selects the appropriate OR 30/AOR 42 or SR 28 routine to be executed and initiates the execution of the selected routine by CPU 44. At the conclusion of execution of the selected routine, SR 28 indicates the results of the selected operation to the user through Display 48 by displaying a message or or the portion of the document currently being operated upon as modified by the operation. For example, if the user is entering text, SR 28 will accept the alphanumeric keystrokes, select the AOR 40 routines to enter the alphanumeric characters in ADS 40, and update Display 48 to display the text as the characters are entered.

c. Overlay Routines 30

As described above. OR 30 includes all document manipulation routines and thereby effectively comprises the document processing system. MOS 26 and SR 28 in turn comprise the operating systems supporting the document processing system implemented in OR 30.

In the presently preferred embodiment of the document processing system, the document structure, described further below, may be accessed and manipulated only through OR 30. In this regard, it should be noted that while MOS 26 and SR 28 may perform certain operations with regard to DS 32/ADS 40, these operations due not include actual manipulation of or access to the document structure. OR 30 thereby defines the interface between the document structure and other elements of System 10 and effectively completely separates the features of the document structure from the remainder of the system. Because of this, the document structure or the system, for example, MOS 26 or SR 28 or the actual physical structure of System 10, can be freely modified or changed with minimum effect upon other portions of the system. The document structure may, for example, be transported to or implemented in a centralized system, rather than the distributed system shown in System 10, without change. Alternately, if the document structure is modified, only OR 30 need be correspondingly modified and the remainder of System 10, for example, MOS 26 and SR 28, are undisturbed.

A further feature of OR 30 resides in the method by which the interface and access between OR 30 and the document structures, that is, the manner in which the document processing system is allowed to manipulate the document structure, is controlled and defined. This control is particularly significant when an existing system is being modified, for example, to add new features or to improve existing features. In a document or word processing system of the prior art, a designer or modifier of a document processing system directly determined and defined the means and manner by and in which the system accessed and manipulated the document structure. As a result, there were effectively no positive constraints upon how the system modifier manipulated the document structure and there were frequent and severe problems with a modified system.

In the presently preferred embodiment of the present document processing system, OR 30 is comprised of routines selected from a fixed library of routines referred to as the Document Management Library (DMLIB). The DMLIB routines are the only routines allowed to access or manipulate the document structure and effectively comprise a set of building blocks from which a document processing system can be constructed.

The DMLIB includes routines for all possible basic manipulations of the document structure and may be expanded as new manners of manipulating the document structure become desirable. To create a new document processing system or to modify an existing system, therefore, the designer determines the operations to be performed or how the existing operations are to be modified and selects and assembles, or links, the appropriate routines from the DMLIB. By doing so, the designer is assured that the operations of the new or modified system will not conflict with the document structure.

Finally, and as previously described, AOR 42, which resides in WSM 38, is a subset of the OR 30 routines and is comprised of the OR 30 routines currently being used to operate upon a document. AOR 42 and OR 30 thereby differ from SR 28 in that AOR 42 does not comprise a complete, resident copy of OR 30 but varies with time, depending upon which operations are being performed. It is for this reason that the document manipulation routines are referred to as 'overlay' routines, that is, routines are selected and overlayed into AOR 42 in WSM 38 as required. A related group of OR 30 routines which are overlayed into AOR 42 as a group are referred to as an 'overlay'.

d. Document Structure 32

As previously described, a Document File 24 contains a complete, or nearly complete, copy of a document residing in System 10. This master copy of the document is contained in Document Structure (DS) 32, which resides in Disc 18. Those portions of the document being operated upon are copied into and reside in WSM 38 in Active Document Structure (ADS) 40 and remain therein while being operated upon. As new portions of a document are operated upon, the previously resident portions of the document are copied back into Disc 18. Similarly, those portions of a document which are being newly created, that is, by being entered by a user, first reside in ADS 40 and are subsequently copied into Disc 18. DS 32 and ADS 40 are thereby analogous to OR 30 and AOR 42 in that ADS 40 is a time varying subset of DS 32, the contents of which vary as different portions of a document are operated upon.

Transfers of portions of documents between Workstation 14 and Master Unit 12 are executed on the basis of 512 byte blocks, corresponding to the capacities of data entry and transfer buffers, described below, residing in Workstation 14 and to the capacity of a double sector of Disc 18. It should be noted that all transfers between Master Unit 12 and a Workstation 14, including transfers of document manipulation routines, are performed on this basis.

Having described the overall structure and operation of System 10, certain portions of the control and document structure described above will be described in further detail below.

2. Control and Document Structure (FIGS. 3 and 4)

Figure 3:
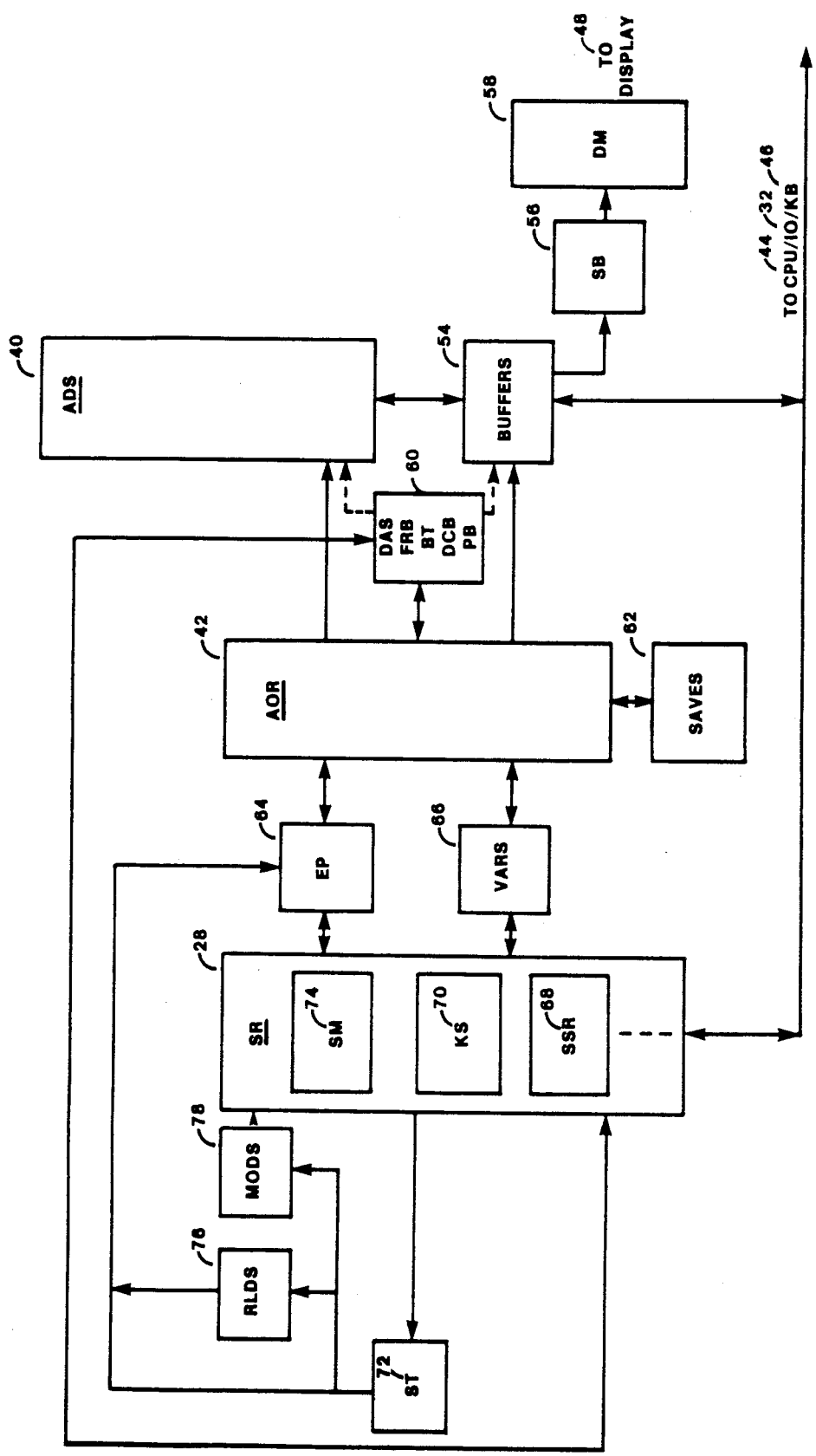
FIG. 3 is a block diagram representation of the work station control and document structure of the system of FIG. 1; and, FIG. 4 is a diagrammic representation of the document structure of the present invention.
Figure 4:
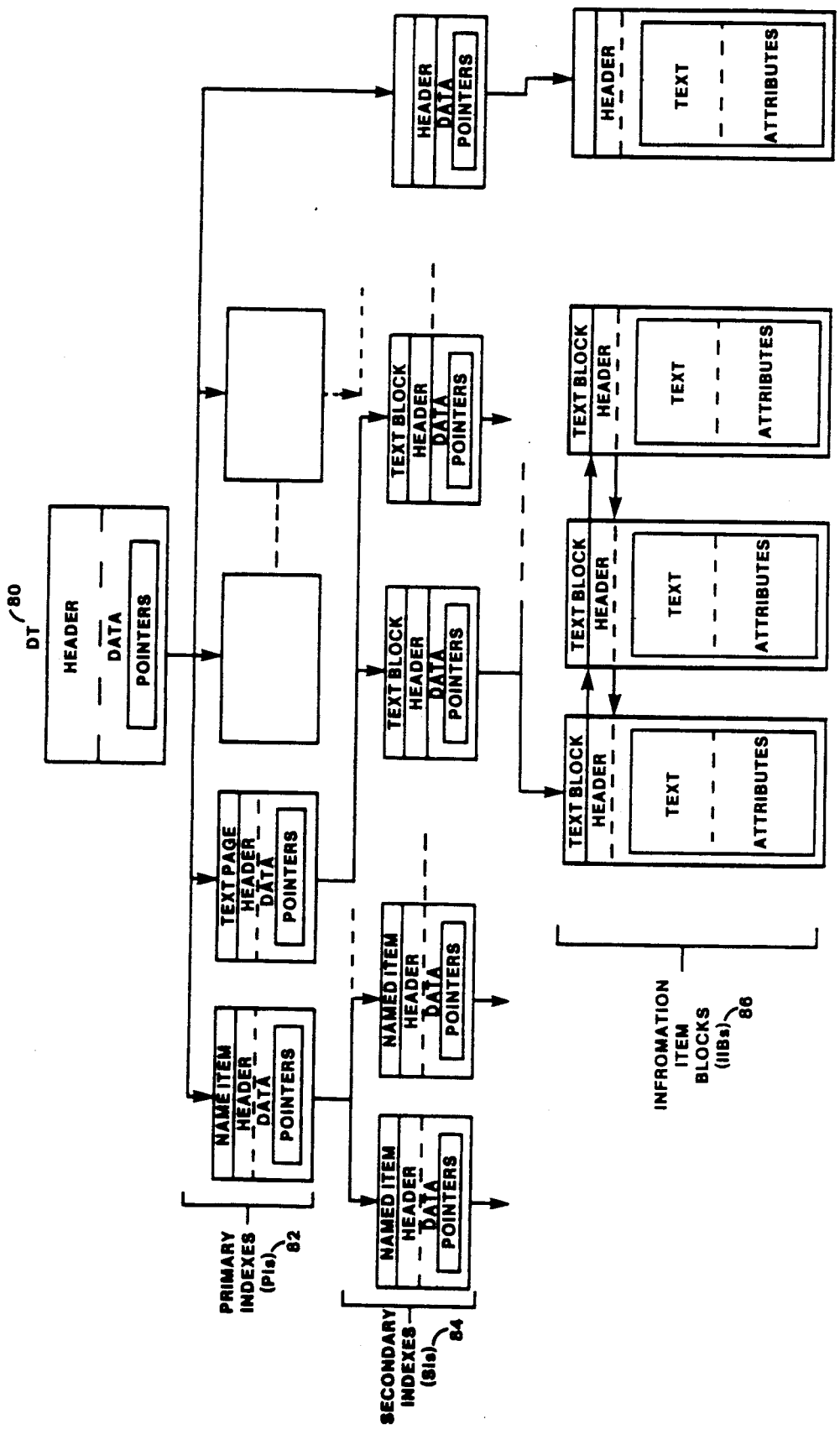

Referring to FIG. 3, a block diagram of the control and document structures residing in Workstation 14, and in particular in WSM 38, is shown. As previously described, the Workstation 14 control and document structures include SR 28 and AOR 42 and ADS 40. Also shown are other structures associated with and operating with or as part of SR 28, AOR 42 and ADS 40. The relationship and operation of the structures shown in FIG. 3 will be described first, followed by a description of the document structure of the present invention.

The physical structure and operation of Workstation 14 should be noted during the following descriptions. That is, that SR 28 and AOR 42 are comprised of routines, that is, sequences of instructions, which are read from WSM 38 to CPU 44 to direct and control the operation of CPU 44 and other elements of Workstation 14. CPU 44 in turn responds to instructions provided from SR 28 and AOR 42 to read data, for example, document text from ADS 40, operate upon the data as directed by the instructions, and, for example, transfer the results of the operations into ADS 40.

A. Block Diagram Description (FIG. 3)

As previously described, the major elements of the structures shown in FIG. 3 include ADS 40, the document segments currently being operated upon, AOR 42, the document manipulation routines currently being utilized, and SR 28, the workstation operating system.

a. ADS 40 and Associated Structures

Considering first the document structures and primary data transfer paths shown in FIG. 3, as described above ADS 40 is a time varying subset of DS 32 and comprises those portions of the document currently being operated upon. As differing portions of the document are operated upon, document segments are transferred between ADS 40 and DS 32. For example, if the already existing text of a document is to be modified, such as by the addition of deletion of text, the portions of the document to changed are read from Disc 18 and into ADS 40. The changes are entered through KB 46 by the user and, after the changes are accomplished, the changed portions of the document will be subsequently read back into DS 32 to provide space in ADS 40 for further segments of the document. In further example, when portions of a document are being newly created, the text information is entered through KB 46 by the user, assembled into the document in ADS 40, and subsequently read into DS 32 as the available space in ADS 40 is filled.

1. Buffers 54

Two further structures are directly associated with ADS 40. The first is Buffers 54, which are a set of general purpose buffers created by SR 28 and primarily used for input/output operations to and from ADS 40. Buffers 54, for example, are used in the transfer of document segments between Disc 18 and ADS 40 and in the entry of text from KB 46 to ADS 40.

In the presently preferred embodiment, Buffers 54 contains between three and ten buffers, each of which has a capacity of 512 bytes. The capacity of Buffers 54 is, as described above, based on the capacity of a double sector of Disc 18 and the size of the blocks transferred between Master Unit 12 and Workstation 14.

2. Screen Buffer 56 and Display Memory 58

Associated with Buffers 54 are Screen Buffer (SB) 56 and Display Memory (DM) 58. DM 58 contains, at any time, the information which is currently being displayed on Display 48 while SB 56 is a buffer through which information to be displayed is written into DM 58. As will be described below, DM 58 is the source for information being displayed by Display 48 and is thereby being frequently read by Display 48. The function of SB 56 is to hold information to be displayed until a time is available to write information into DM 58 and, by doing so, frees Buffers 54 for other operations.

The information displayed by Display 48 may include visual representations of portions of a document being operated upon, that is, a portion or all of the contents of ADS 40 and, for example, messages from System 10 to the user to aid or guide the user in operation of System 10. Examples of the latter may include menues through which the user may select operations to be performed, examples of which are well known through Wang Laboratories, Inc. Office Information Systems (OIS).

As indicated in FIG. 3, information to be displayed is written into SB 56 through Buffers 54 and may be entered either a single character at a time or in blocks of information up to the capacity of a Buffer 54 or SB 56. Single character entries are used, for example, when a user is entering alphanumeric characters into a text, that is, a single character at a time through KB 46. In this case, the individual characters are entered into one of Buffers 54 and concurrently transferred, again a character at a time, into ADS 40 and SB 56. Block entries may be used, for example, when a user is moving from one section or page of a document to another, necessitating the display of entirely new screens of information by Display 48.

Information entered into SB 56 is subsequently transferred into DM 58, which contains one or more display screens of the information actually being displayed by Display 48. Display 48 in turn reads the information for the currently displayed screen from DM 58 and presents this information to the user in visual form.

It should be noted at this point that the form in which information is stored in DM 58 is dependent upon the capabilities of Display 48. There are two primary forms of display, character generated and bit mapped. In a character generated display, the information to be displayed is stored in the form of codes representing the characters or symbols to be displayed. The display reads these codes and, through a character generator, converts the codes into patterns of illuminated dots forming the characters on the display CRT. In a bit mapped display, the actual patterns of the dots forming the displayed characters or symbols are stored, rather than codes, and the stored information is displayed directly. A bit mapped display is advantageous in that complex graphics displays, such as pictorial images, are more easily generated, but are more expensive in that they require substantially greater memory capacity for storing the display information.

As will be described below, the document structure of the present invention will support bit mapped images as elements of a document, this capability is not available, however, in a character generator display. An alternate form of graphics display, referred to as character set graphics, may be provided by the present document processing system. Character set graphics are based upon the manner in which characters and symbols are generated upon a CRT screen, that is, as rectangular matrices of dots, for example, 5 by 7 dots. The individual characters are then generated by illuminating certain dots of the matrix while leaving the remaining dots dark. In a character set graphics display, provision is made to generate a wide range of symbols, or patterns of dots and a code assigned to each symbol. These graphic symbols, or dot patterns, are then assembled in arrays on the screen to generate the desired graphics image.

3. Document Access Structure 60

The second structure directly associated with ADS 40 is Document Access Structure (DAS) 60, which contains information locating and interrelating various areas in ADS 40 and Buffers 54 and the information residing therein. DAS 60 is used by AOR 42 routines, and in part by SR 28 routines, to locate and operate upon items of information in ADS 40 and Buffers 54. DAS 60 is thereby the principle interface between the document structures, that is, ADS 40, and the document manipulation routines, that is, AOR 42. DAS 60, by providing information relating ADS 40 and Buffers 54, the input/output path for ADS 40, thereby also comprises the principle link, or access path, between ADS 40 and the remainder of System 10, including DS 32.

DAS 60 is originally generated by SR 28 and contains four major elements, a File Reference Block (FRB), a Buffer Table (BT), a Document Control Block (DCB) and a set of one or more Position Blocks (PBs).

The FRB primarily contains information used for document communication between Workstation 14 and Master Unit 12. Examples of this information include a Reference Number identifying the particular document during the period in which the document is being operated upon and a Reference Control Block. The Reference Control Block in turn contains information indicating whether an I/0 request has been generated by the workstation, as described above, and whether errors have been detected. The Control Block also contains information generated by the workstation indicating whether a document file is to be created for a new document and whether a document is to be transferred in its entirety to its DS 32, that is, 'clean-up' at the end of operation on the document.

The BT is generated by OR 30 and is used by SR 28 to maintain and operate Buffers 54. The BT is primarily comprised of a set of pointers and information indicating the locations and capacities of the buffers of Buffer 54 in WSM 38.

The DCB contains information identifying the document currently being operated upon and the current status of that document. The DCB also contains information through which OR 30 may locate the FRB and BT.

The PBs contain information denoting specific positions within the document being operated upon. Almost all forms of access to the document are performed through a PB and a PB may be initialized by most routines requiring access to the document. For example, an AOR 42 routine to move a portion of text from one location within the document to another location will initialize a PB pointing to the initial and destination locations of the text to be moved. The move routine will then use this information in moving the text.

b. AOR 42 and Associated Structures

As previously described, OR 30 includes all actual document manipulation routines and thereby comprises the actual document processing system. AOR 42 is a time varying subset of OR 30 and is comprised of the OR 30 routines currently being used to operate upon a document. Related groups of OR 30 routines, referred to as 'overlays' are read from OR 30 and overlayed into AOR 42 as required for the selected document operations. The routines in AOR 42 access and operate upon ADS 40 and Buffers 54, using information contained in DAS 60, which is also accessed and operated upon by AOR 42.

As previously described, the document processing system has the capability of 'nesting', or 'stacking' document manipulation routines. For example, if the user is executing an 'insert' routine to insert text into a document, the user may, without terminating that operation, initiate a second operation, for example, an 'insert' or 'delete' operation within the text being inserted. The second, or interrupting, routine is initiated and executed without exiting the initial, or interrupted, routine, and, at the conclusion of the interrupting routine, the system returns to the initial routine. The user may 'nest' several such routines and the routines will be returned to in the reverse of the sequence in which they were initiated.

The nesting of OR 30 routines, and any necessary saving of AOR 42 routines due to overlay operations, is accomplished through the operation of Save Stack (SAVES) 62 associated with AOR 42. As will be described further below, SAVES 62 is a part of the stack structure associated with and controlled by SR 28.

The saving of an AOR 42 routine is accomplished be transferring a copy of the entire routine into the corresponding DF 24, that is, into a SS 34, together with other associated information pertaining to the state of operation of the system. When this occurs, 28 places on SAVES 62 a file Reference Serial Number (FRSN) identifying the memory image of the saved routine, that is, the location of the saved routine. When the saved routine is returned to. SR 28 reads the saved routine FRSN from SAVES 62, uses the FRSN to find and copy, or overlay, the routine from the DF 24 to AOR 42, and reinitiates execution of the routine.

b. Control Transfer and the SR 28/AOR 42 Interface

Before continuing to a description of SR 28, it is necessary to consider the structure and operation of the control structures which form the interface between SR 28 and AOR 42 and which are used to transfer control from one routine to another, either within SR 28 or AOR 42 or between SR 28 and AOR 42. The transfer of system control from one routine to another requires, first, an identification of the routine to which control is passed, and second, a means for passing information from the original routine to the routine assuming control. The elements through which these operations are accomplished and which comprise the interface between SR 28 and AOR 42 include Execution Pointer (EP) 64 and Variable Stack (VARS) 66. cl 1. Execution Pointer (EP) 64 and Vectors Routines are identified, located and initiated through the use of 'vectors', which are essentially logical, as opposed to physical, addresses of the routines so identified. Each vector contains sufficient information, as described below, to identify, overlay if necessary, and execute a routine. Each vector includes three information fields, a Type field, a Size field and a File Reference Serial Number (FRSN)/Address field.

The vector Type field contains information as to whether the corresponding routine is a Resident or Local, Overlayed, Saved or Internal routine. A Resident routine is any routine which is always resident in memory, that is, always resides in WSM 38. An example of a Resident routine is any of the SR 28 routines. A routine which is part of a given overlay, that is, a related group of OR 30 routines, is 'Local' to that overlay and to any other routine within that overlay. A Local routine thereby becomes a Resident routine for execution purposes when the overlay to which it is Local is read into AOR 42.

An Overlayed routine is any routine which must be loaded into WSM 38 from Disc 18 and includes all OR 30 routines in OR 30 overlays.

A Saved routine is any routine or overlay which must, due to its nature, be saved as described above before another overlay is loaded into AOR 42. An Internal routine is any routine or overlay has been saved, as just described. That is, a Saved routine is a routine which must be saved while an Internal routine is a routine which has been saved.

The vector Size field is used with reference to overlays and indicates the size, or number of 256 byte sectors in the overlay.

The contents of a vector FRSN/Address field depends upon the Type of the routine. In the case of a Resident routine, the FRSN/Address field contains the address of the starting point of the routine. In the case of an overlay, the FRSN/Address field contains the FRSN of the routine, that is, a logical address used to identify and locate the routine and to load the routine into AOR 42. The starting address of an overlay routine is assumed to be the first location in the overlay area of WSM 38, that is, the first location in AOR 42; this location contains the start of a routine leading to the selected routine.

Control is passed from one routine to another by means of vectors loaded into EP 64 from either AOR 42, SR 28 or Reload Stack (RLDS) 76, which is associated with SR 28 and described further below. Each time a currently controlling routine is to pass control to another routine, the controlling routine loads into EP 64 the vector of the routine to which control is to be passed. SR 28 includes routines which monitor the contents of EP 64 and, when a vector is detected therein, executes a routine, using the vector, to locate and initiate execution of the new routine.

The operation performed by SR 28 in passing control to a new routine depends upon the Type of the routine, as determined by the vector Type field. If the routine is Resident or Local to an overlay currently residing in AOR 42, the vector FRSN field is used as a pointer, or address, to the start of the new routine and control is transferred to the new routine at that point.

If the vector Type field indicates that the new routine is an Overlayed routine, the vector FRSN/Address field contains the FRSN of the routine. In this case, SR 28 initiates a routine, utilizing the new routines' FRSN. to read the overlay containing the new routine from Disc 18 and into AOR 42. When the overlay operation is completed. SR 28 transfers control to the first location in AOR 28 which, as described above, is the start of a routine leading to the entry point of the new routine.

If the vector Type field indicates that the new routine has been saved or stacked, as described below. SR 28 will, if it resides in SR 28 or currently resides in AOR 42, execute a routine to reinitiate the routine. If the routine resides in a SS 34. SR 28 will execute a routine to reload the routine from SS 34 before reinitiating.

2. Variables Stack 66 and Passing of Information

As described above, the passing of control from one routine to another requires a means for passing information from the controlling routine to the routine to which control is to pass and, in particular, from the passing routine to SR 28, the workstation operating system. This function is performed through Variable Stack (VARS) 66, which receives such information from and provides such information to the SR 28 and AOR 42 routines.

As will be described further below with regard to SR 28, the workstation operating system operates is a state machine, that is, the response to any given input or condition will depend upon the 'state' in which the system is operating. Accordingly, the information written into VARS 66 includes, as described further below, an identification of the system state in which routines are to be executed and space is reserved on VARS 66 and a variables entry made each time a new system state is entered.

Having described the interface between SR 28 and AOR 42 and the means by which control is passed between routines, the operation of SR 28 and its associates structures will be described next below.

c. SR 28 and Associated Structures

As described above, SR 28 comprises a state machine operating system for Workstation 14, that is, the response of the system to any particular input or condition is, as determined by SR 28, dependent upon the particular current operating 'state' of the system. In addition to controlling the overall operation of Workstation 14 and supporting the operation of the document processing system implemented in OR 30/AOR 42, SR 28 accepts and processes user keystroke inputs and provides a stack mechanism for the stacking, or nesting, of operations.

1. Slave and Service Routines 68

As indicated in FIG. 3, SR 28 includes Slave and Service Routines (SSR) 68 for directing, for example, operations between Workstation 14 and MOS 26, such as generating and handling requests for information transfers between Workstation 14 and Disc 18. The general operation of SSR 68 is described in U.S. Pat. No. 4,145,739, previously incorporated herein by reference.

2. Keystroke Processing and System State

As described above, a primary visible focus of the operation of System 10 is the interactive operation between System 10 and a user through KB 46 and Display 48 in the generation and manipulation of documents. System 10 may be regarded in certain aspects, therefore, as a keystroke processing system. That is, a user enters data (text) and text/document manipulation commands by means of keystrokes through KB 46 and the system responds by executing the appropriate routines selected from AOR 42 and SR 28 to correspondingly modify the contents of ADS 40. SR 28's keystroke processing mechanism, which includes Keystroke Routines (KS) 70, is thereby the principle input interface between the user and the system.

The response of the system to particular keystroke inputs is, as previously described, dependent upon the particular state of operation of the system, that is, upon what operations the system is currently executing. SR 28 thereby incorporates a state machine mechanism, including State Table (ST) 72, which interacts with SR 28's keystroke processing mechanism to determine the appropriate response to user keystroke inputs.

The response of the keystroke processing mechanism to particular keystrokes is further determined in ST 72 by the class of the particular keystroke, wherein a class is a group of keystrokes having similar functions. The following keystroke classes are implemented in the presently preferred embodiment of the present invention:

| | | |
|---|---|---|
| GRAPHIC | DELETE | COLUMN |
| CURSOR | REPLACE | SAVE |
| SCREEN | VISUAL | RECALL |
| PAGE | INFORMATIONAL | HELP |
| GOTO PAGE | FORMAT | SUPER SEARCH |
| INSERT | MARK | SUPER COPY |
| SEARCH | COMMAND | SUPER REPLACE |
| COPY | GLOSSARY | SUPER COMMAND |
| MOVE | PRINT | DEFAULT |
| EXECUTE | NAME | VIEW |
| CANCEL | | |

ST 72, as described above, contains information relating machine state and keystroke class to corresponding routine vectors and is arranged as a set of rows wherein each row contains, in order by keystroke class, the vectors for each keystroke class for a particular state. ST 72 may thereby be indexed by state, to select a corresponding state row of vectors, and by keystroke class, to select a vector for that keystroke class in that state.

Considering now the operation of the keystroke processing and state machine, KS 70 receives information regarding keystroke inputs from KB 46 through CPU 44. This information identifies both keystroke class and the specific keystroke within the class. As previously described, information regarding current machine state resides in VARS 66. The keystroke class, keystroke and state information is provided, as indicated in FIG. 3, to the keystroke handling routines of KS 70. The keystroke handling routines in turn generate a corresponding input to ST 72 to index the state tables by state and keystroke class. ST 72 responds by providing as an output a vector identifying the appropriate SR 28 or OR 30/AOR 42 routine for the keystroke and machine state. As previously described, the vector output of ST 72 is loaded into EP 64 and the appropriate action, depending upon routine Type, is initiated by SR 28. As also indicated in FIG. 3, and as described further below, ST 72 concurrently provides the resulting vector as inputs to SR 28's stack mechanism.

3. Stack Mechanism

As previously described, SR 28 provides a stack mechanism performing three primary functions, which are identifying which overlay should currently reside in AOR 42, identifying which routine is currently being executed, and storing the memory image of saved overlays. The saving of overlays, that is, AOR 42 routines, by SAVES 62, which is a part of the SR 28 stack mechanism, has been previously described with reference to the operation of AOR 42.

The remaining stack mechanism functions are performed by Reload Stack (RLDS) 76, previously mentioned, and Module Stack (MODS) 78 which, as indicated in FIG. 3 and previously described, receive inputs from the vector output of ST 72.

RLDS 76 receives and stores vectors from ST 72 and the top of RLDS 76 always contains the vector of the overlay which should currently be in AOR 42. RLDS 76 allows the vectors of interrupted routines to be saved so that interrupted routines may be returned to at the completion of execution of the interrupting routines. In this respect. RLDS 76 is the primary means of saving routines when it is not necessary to save the actual routine, for example, by stacking the vector of an interrupted overlay routine. As previously described, SAVES 62 is provided to save routines in their entirety, that is, the actual code, when necessary. As indicated in FIG. 3, RLDS 76 provides an input to EP 64 to allow the loading into EP 64 and subsequent reinitiation of interrupted routines.

MODS 78 receives and stores only the Type field of the vector of the currently executing routine. The information residing in MODS 78 is used by SR 28 in determining the appropriate handling of interrupted and returned routines and may be updated as the Type of a routine changes, for example, from overlay to resident.

SM 74 includes certain routines which are of interest in understanding the operation of SR 28's stack mechanisms; these routines include FREE, LOAD, PUSH, POP, RELOAD and ENTRY and will be described below in that order The primary function of FREE is to free the overlay area, that is, AOR 42, for the loading of another overlay, by setting a flag indicating that AOR 42 is to be 'reloaded' with the proper overlay. Other routines in SR 28 detect the state of this flag and initiate the appropriate operation to reload AOR 42. For example, if the information residing in the top of RLDS 76 indicates that the current overlay must be saved, SR 28 will initiate an operation to save that overlay in SAVES 62 before initiating a request to load AOR 42 with the new overlay.

LOAD is used to initiate overlay routines and is called after EP 64 is loaded with a vector to the new overlay routine. If the routine must be overlayed, that is, loaded into AOR 42. LOAD will in turn call FREE. In addition. LOAD will save, on RLDS 76, the vector of the routine calling LOAD for subsequent use by PUSH or ENTRY. described below.

The function of PUSH is to stack information concerning the last loaded overlay so that the overlay may be recovered if destroyed in some manner. PUSH first pushes the Type field of the last loaded overlay onto MODS 78. If the routine is not resident, PUSH will also push the routine's entire vector onto RLDS 76. If the routine is of the type which must be saved, PUSH will push the routine onto SAVES 62 and place the FRSN of the routine's location in SAVES 62 into the FRSN/Address field of the routine's vector on RLDS 76. In addition, PUSH will change the vector's Type field from 'saved' to 'internal' to reflect the change in Type of the routine.

The function of POP is to 'throw away' the top entry of MODS 78. If this routine is not of the resident Type. POP will also throw away the top entry of RLDS 76. If the routine is of the saved Type, POP will also delete the entry in SAVES 62. Finally, POP will reset a 'reload' flag to indicate to SR 28 that the correct overlay is not resident in AOR 42.

The function of RELOAD is to ensure that the routine specified by the top vector of RLDS 76 is currently resident in AOR 42. If the reload flag is set and the current routine, as indicated by the top entry in MODS 78, is a nonresident Type, RELOAD will load the correct overlay into AOR 42.

ENTRY operates in conJunction with LOAD to provide the entry point of the last LOADed routine.

Having described the structure and certain aspects of the operation of SR 28 and, in particular, the keystroke processing and stack mechanisms of SR 28, the fundamental operating sequence of SR 28 as a whole will be described next below.

4. Basic Operating Sequence of SR 28

The primary functions of SR 28 and the state machine implemented therein are, as described in part above, to maintain and operate the state machine, to overlay routines as required, to handle critical displays, for example, messages and menues, and to accept and process keystrokes. To perform these functions, SR 28 and the state machine repeatedly execute, in order, a sequence of four phases of operation. These phases are referred to, in the order executed, as the Overlay, Reload, Display and Keystroke phases and will be described next below in that order.

a. Overlay Phase

Overlay Phase is responsible for ensuring that the selected routine is in AOR 42, and for executing the selected routine.

This phase begins with the vector of the selected routine residing in EP 64. If the routine s resident in memory, that is, in AOR 42 or SR 28, the machine skips to execution of the routine. If the routine is not resident, that is, is an overlay routine not resident in AOR 42, SR 28 calls LOAD by loading LOAD's vector into EP 64 and the overlay is loaded into AOR 42.

With the routine resident in memory, SR 28 proceeds to execution of the routine, by first calling ENTRY to determine the entry point of the routine and then executing the routine.

The Overlay Phase is usually completed at this point, that is, when the execution of the selected routine is completed. In certain cases, however, the selected routine may invoke routines residing in other overlays. In such cases, EP 64 is loaded with the vector to the invoked routine and the Overlay Phase is restarted.

Reload Phase

Reload phase is provided and initiated to ensure that the currently active routine is resident in AOR 42 in certain cases when the Overlay Phase does not perform this function.

The first such case is that of certain overlay routines which invoke other routines that, when completed, return control to the general SR 28 routines rather than to the invoking routine. The second case occurs when a routine, when completed, calls POP rather than returning to the invoking routine.

In both cases, the function of Reload Phase is to reload the correct overlay into AOR 42 and does so by calling RELOAD, described above.

c. Display Phase

SR 28 performs all critical display functions to Display 48 during this phase. Such displays include providing prompts and messages to the user, displaying menu choices available to the user, and updating the display of attributes, described further below.

d. Keystroke Phase

During this phase, SR 28 performs the keystroke processing operations previously described. That is, SR 28 receives a keystroke from KB 46 and state information from VARS 66, indexes ST 72 for the class of keystroke and current state to obtain the correct vector for the selected routine, and loads the vector into EP 64.

At this point, the machine has returned to the initial condition of the Overlay Phase and the four phases are repeated in the order and as described above.

Having described the control structure of the present system, the document structure of the present invention will be described next below.

B. Document Structure (FIG. 4)

The document structure of the present invention, that is, DS 32, is, as previously described, designed for efficient use of memory capacity while providing the flexibility required to generate very complex documents and to support advanced editing features. The primary function of the document structure is the storage and ready access of sequential text, organized into logical user specified pages of arbitrary length. The structure allows fast and efficient character and page editing and allows for the application of a large number of visual attributes or enhancements, to the characters of a text. Certain of these editing features include visual attributes, such as underlining, bold type and various fonts, and information attributes, such as notes, footnotes and voice. The document structure also allows the application of character related information which is not primary visual in nature, such as optionally printed text, table of content and index generation, and temporary markers used for editing aids. Additional features allow the user to assign names to various portions of a document and to access and operate upon named portions through those names.

As shown in FIG. 5, the basic element of a document is a fixed size block (BLOCK 503) of information, the size of which is determined by a convenient and efficiently sized unit of memory space in which the document is created and operated upon. In the present embodiment in System 10, the block size is determined to be two Disc 18 sectors, that is, 512 bytes. In another system, for example, a centralized system based upon a general purpose computer, the block size may be determined by the size of the data blocks transferred between the computer main memory and a cache memory, or a multiple thereof. Each BLOCK 503 has associated with it a File Reference Serial Number (FRSN) by which it may be located. In FIG. 5, the FRSNs are represented by numbers in parentheses following "503".

As will be described below, a document structure is constructed of several different types of blocks, each having a unique internal structure and serving different, specific purposes and assembled as required to create a document. Of these blocks, certain blocks are required in any document while others are used as required. Certain blocks are always located at fixed points in the document and others are located through the pointers which form an integral part of the document structure. In addition, certain blocks, for example, blocks containing text, may be chained together as required. The document structure is thereby flexible and expandable, occupying no more memory capacity than is required for a particular document but capable of accommodating very large and complex documents, and provides fast and easy access to any part of a document.

1. Basic Block Structure

All blocks in the present document structure have a fixed internal structure comprised of a Header area and a Data area. The Header area in turn has a standard, fixed structure while the structure of the Data area depends upon the block type.

The Header area, (shown in FIG. 6) includes a Block Type field (BT 1001) identifying the block type, Forward (PL 1005) and Backward (PL 1007) Pointer fields used to chain together blocks of the same type, and Top (TO 1009) and Bottom (AO 1011) Offset fields identifying the location of the block data within the Data area. Other Header fields include a Number Of Items field (in UD 1013) used in data compression and recovery operations, a Document ID field used to identify the document to which the block belongs (UID 1015), and certain Checksum information for error detection (in UD 1013). Not all blocks require the use of all of the fields defined within the standard block Header area; in such cases the unused fields are undefined and are not used but are not deleted from the Header area.

2. Basic Block Types

As described above, each document is comprised of a combination or assembly of various types of blocks, which can be divided into three major functional categories. Management Blocks, Indexing Blocks and Text/Data Storage blocks, referred to as Information Item Blocks. Certain blocks are required in any document while other blocks may appear only in complex documents and the document structure allows the addition of further block types as required.

Management blocks are required in any document and contain printing and statistical information and user defined editing parameters for the document. Presently defined Management Blocks include an Administrative/System Block, a Style Block and a Free Block Bit Map Block.

Indexing Blocks are used to locate the various Information Item Blocks which contain the actual text and information of the document. Presently defined Indexing Blocks include a Document Table, a Named Item Index, and Primary and Secondary Indexes. The Document Table is located at a fixed point in the document and is used to locate the Named Item Index and the Primary Indexes. The Primary Indexes are used in turn to locate the Secondary Indexes and the Secondary Indexes are used to locate Information Item Blocks. Certain Information Item Blocks, and the Named Item Indexes, may be chained together through the Forward and Backward Pointers contained in their Header areas, thus providing yet another level of linking of blocks.

It should be noted that when a document does not contain more Information Item Blocks of a given type than can be identified within the capacity of a single Secondary Index, the Primary Indexes for that block type are not created and the Document Table entry for that type points directly to the single Secondary Index for that block type.

Finally, the Information Item Blocks contain, as described above and described in detail below, every type of information appearing in a document. Most Information Item Blocks having text can have that text enhanced by visual attributes, such as color and font, and can contain references to information attributes, such as format lines and footnotes.

The presently defined types of Information Item Blocks, each of which will be described in further detail below, include:

| Text | Formats |
|---|---|
| Headers/Footers | Pictures |
| Free Form Regions | Text Shelves Footnotes |
| Notes | Equation Regions |
| Voice Messages | Merge Data |
| Data Shelves | |

Certain embodiments of the present invention may also provide Matrices Blocks and External Data Blocks, as described below.

As described above, additional Information Item Block types may be defined as required and incorporated within the document structure in the same manner as the types listed above.

Other types of references which may be inserted into a document include, in addition to attributes described below, Text Insertion References and Named Marks. The document structure described below also includes, as described below, means for handling text appearing in column form.

3. Minimum Document Blocks

As described above and shown in FIG. 7, certain of the blocks described above are required in any document. In the present embodiment of the document structure, these blocks include, for a minimum document, the:

| | |
|---|---|
| Document Table (DT 80) | Secondary Text Index (SPIX 619) |
| Administrative/System Block (AD 603) | Text Block (TB 621) |
| Style Block (SB 605) | Secondary Format Index (SFIX 615) |
| Free Block Bit Map (BM 601) | Format Information Item Block (FIIB 617) |

It should be noted, with regard to the two Secondary Indexes entries listed above, that, as previously described, a minimum document may contain a single Secondary Index for a particular Information Item Block and the Secondary Index may be located directly through the corresponding Document Table entry.

Having described the major categories of block type, and briefly the types of block within each category, each of the block types will be described in further detail below.

4. Management Blocks

The Administrative/System Block contains keystroke interpretation and administrative information and may be chained to other Administrative/System Blocks for very complex documents.

The Style Block contains user definable defaults concerning, for example, document character style to be used if the user defaults, that is, does not define a different style.

The Free Block Bit Map Block contains information identifying, for each block in a document, whether a particular block is currently in use. Bit Map Blocks are used by the system to efficiently allocate and deallocate blocks, that is, memory space. Bit Map Blocks may be chained, thereby allowing a complete physical mapping of every block or, in the present embodiment, disc sector.

5. Indexing Blocks

The following descriptions of the Indexing and Information Item Blocks will refer to FIG. 4, which illustrates the document structure of the present invention and the relationships between Indexing and Information Item Blocks.

As previously described, the Indexing Blocks include the Document Table, Primary Indexes and Secondary Indexes. Referring to FIG. 4, each document contains a single Document Table (DT) 80, which contains a pointer to a Primary Index (PI) 82 for each type of Information Item Block type appearing in a particular document. Each PI 82 in turn contains pointers to one or more Secondary Indexes (SIs) 84 for that Information Item Block type and each SI 84 contains, in turn, pointers to the Information Item Blocks (IIBs) 86 of that type appearing in the document. As previously described, in those cases wherein the number of IIBs 86 of a certain type is less than the number of pointers which may be accommodated in a corresponding single SI 84, the corresponding PI 82 is not used and the DT 80 entry points directly to the SI 84 for that IIB 86 type.

It should be noted that, in the present embodiment, the pointers used in the Indexing Blocks, that is, in DT 80, PIs 82 and SIs 84 are comprised of File Reference Serial Numbers, that is, the logical as opposed to physical addresses of the elements pointed to.

As will be described further below, IIBs 86 of certain types may be chained together with other IIBs 86 of the same type through the Forward and Backward Pointers in the IIB 86 Header areas. In such cases, an SI 84 pointer to a chain of IIBs 86 may point to the first IIB 86 of the chain and the remaining IIBs 86 of the chain may be located through the Forward and Backward Pointers.

a. The Document Table

The DT 80 is always located at a fixed point in the document structure, that is at the start of the document, and there is only one DT 80. The Header area of DT 80 is of the standard fixed structure previously described. The Data area contains a space or location for a pointer to the PI 82 or SI 84 for each possible type of IIB 86. If a particular type of IIB 86 does not appear in a document, the DT 80 entry for that type is null entry, for example, zero.

In the present embodiment, the DT 80 Data area contains the following pointers:
Named Item Index Primary (or Secondary) Text Index
Primary (or Secondary) Format Index
Primary (or Secondary) Note Index
Primary (or Secondary) Free Form Region Index
Primary (or Secondary) Footnote Index
Primary (or Secondary) Header Index
Primary (or Secondary) Footer Index
Primary (or Secondary) Matrix Index
Primary (or Secondary) Picture Index
Primary (or Secondary) Voice Index
Primary (or Secondary) External Data Index
Primary (or Secondary) Merge Data Index
Primary (or Secondary) Equation Region Index
Text Insertion Index
Named Marks Index b. Primary Indexes

As previously described, there is a PI 82 for each IIB 86 type appearing in a document and the Data area of each PI 82 contains pointers to the SIs 84 for the corresponding block type. In the Header area of a PI 82, the Number 0f Items field will contain the number of SIs 84 referenced from the PI 82. There will be, in the present embodiment, only one PI 84 for each block type; in other embodiments, for example, PIs 82 may be chainable within each block type.

When a document is first created there will be, as previously described, only SIs 84 and probably only two such SIs 84, one for a Text Page IIB 86 and one for a Format Line IIB 86. As the document grows in complexity, the capacity of single SIs 84 will be exceeded and further SIs 84 will be created. As a second such SI 84 is created for a particular block type, a PI 82 for that type will also be created, with pointers to the SIs 84 of that type, and the DT 80 entry for that type will be changed to point to the PI 82 for that type.

c. Secondary Indexes

The general structure of PIs 84 is similar to that of LIs 82 described above. As previously described, an SI 84 is pointed to by an entry in a corresponding PI 82 and contains pointers to the IIBs 86 of that block type. There may be multiple SIs 84 for a particular block type and, if so, the Header area will contain a flag indicating this fact. SIs 84 may not, however, be chained in the present embodiment, but may be chained in other embodiments.

The SI 84 Data area contains a pointer to each IIB 86 referenced through the SI 84, and for each such pointer, information as to whether the particular information item, that is. IIB 86, is named, the number of times it is referenced, and whether it is referenced from another IIB 86.

1. Secondary Text Page Indexes: FIG. 7

Although the structure of a SI 84 (SPIX 619) for a Text Page IIB 86 is the same as any other SI 84, such SI 84s are unique in that the index contained therein is continuous, that is, no vacant entries (PP 620) are allowed. This restriction provides for a special property of Text Page IIBs 86; that is, that the number of a document page (627(n)), which as illustrated in FIG. 7 is comprised of one or more IIBs 86, is always the same as that of the IIB 86. For example, the entry (PP 620) of the 45th page in a document is always the 45th entry within the first SI 84 Text Page Index. A page's page number is also its Item Number, described in more detail below.

The Secondary Text Page Index may therefore always be used to fine the first Text Page Block of a document's page. A document page can be comprised of any number of Text Page Blocks chained together by the Forward and Backward Pointers in the Block Header areas.

2. Secondary Header and Footer Indexes

Secondary Header and Footer Indexes have the same structure as all other SI 84s except that all item numbers must be assigned on even boundaries when new Header and Footer IIB 86s are created. This restriction provides space in the indexes to allow for the generation of either primary or first and second alternate Headers and Footers.

d. Named Item Index

The Named Item Index, which appears as a PI 82 in FIG. 4 and in more detail as NIX 607 in FIG. 7, provides a parallel access path to IIBs 86 which have been assigned names by the user. That is, an IIB 86 can be located by its name as well as by its Item Number (IN), described below, or FRSN.

The Named Item Index Data area contains an entry (NP 610) for each IIB 86 which has been assigned a name (NA). Each entry includes the IIB 86's type, name and Item Number (IN). In the case of a named text page, IN is the same as the page number (PN). Text Shelves, a type of IIB 86 described below, are identified by their FRSNs rather than by their Item Numbers. Entries are maintained in ascending order by type and name, no blank entries are permitted in the index, and Named Item Indexes may be chained through their Forward and Backward Pointers.

6. Information Item Blocks

As previously described, the actual text or other information of a document is contained in Information Item Blocks (IIBs) 86 and there is a type of IIB 86 for each type of information that appears or may appear in a document.

An IIB 86 may, for example, contain text and/or attributes, text and/or attributes to be interpreted as columns or rows of columns, file names for information stored externally to the document, and any other form of information. Each IIB 86 has an associated Item Number that is used to locate the IIB 86 within the Index Blocks described above. For Information attributes, described below, the Item Number is arbitrary.

In all cases, however, the Item Number leads to the first IIB 86 of an information item of arbitrary length and the blocks may be chained together through the Forward and Backward pointers residing in their Header areas.

The general structure of an IIB 86 is shown in FIG. 6. It is similar to that of the Index Blocks described above, that is, with a standard Header area (602) and a Data area. The Data area differs, however, and may contain text (629) or attributes (630) or both. Text is entered from the top to the bottom of the Data area and attributes are entered from the bottom to the top. A typical Data area may therefore have text in its upper portions, attributes in its lower portion and free area between, which becomes filled as text and/or attributes are entered. Either text or attributes may occupy the entire Data area, or as much of the Data area as is not occupied by, respectively, attributes or text.

In addition to the Forward (NL 1005) and Backward (PL 1007) pointers and other Header elements, the Top (TO 1009) and Bottom (AO 1011) Offset fields of the Header are used to point. respectively, to the last valid character in the Data area and the last valid attribute in the Data area.

Having described the general structure of IIBs 86, the individual types of IIBs 86 of the present embodiment will be described next below. It should be noted that further types may be added as required and that a type described below need not appear in a particular document or implementation.

a. Text Blocks: FIG. 7

The most common form of IIB 86 is the Text Block (TB 621) which contains the text of the document and the attribute information, described further below, pertaining to the text contained therein. Text Blocks contain the actual body of a document text, including all visual and descriptive attributes and all information comprising references. Text Blocks can be chained together or can exist as independent blocks with the main body of a document's text existing as a single chain of blocks, beginning with the first block of the first page of the document and ending with the last block of the last page. Document pages (627) wherein the text occupies more than one Text Block are created, to any arbitrary length, be chaining together Text Blocks.

As described above, text occupies the Data area from top to bottom and attribute information from bottom to top. The last text character appearing in a block is always an End of Text Character to identify the end of a page. Any number of Text Blocks may be chained and a Text Block is referenced either through a Text SI 84 by Item NUmber or through a Secondary Named Text Index by page number or name.

b. Format Blocks: FIG. 9

A Format Block (FIIB 617) contain data pertaining to format lines, that is, lines defining the physical layout characteristics of a text line, for example, the locations of Tabs. All documents must contain at least one format line and a format line may be referenced any number of times from an location within the document and may be named.

As described above, a format reference embodied in a format attribute word (FAW 1201) is used to specify data to control text display, formatting, and printing characteristics, as well as the width of a single or multiple columns. A format reference will be found at the beginning of every text page, at the start of every distinct column region, and at other arbitrary user specified locations within text pages. In addition, a format reference is required at the beginning of item chains for all notes, footnotes, headers and footers and may be found at other locations within such items.

A format reference is a 'forced-break' reference, that is, the attribute character, described below, with which the reference is associated is always the first character in the text block in which it is found. If a new format line is inserted into a Text Block, the block is split into two blocks at the point of insertion and an End Of Text Character, inserted at the end of the text in the block before the inserted format line. This feature allows text to be easily inserted before format lines and page breaks.

Format references are also used to control the placement and configuration of column regions and to specify special conditions, such as the presence of soft or hard page breaks.

c. Text Shelf Blocks: FIG. 7

Text shelves 633 are named storage areas used during editing to save and retrieve portions of text and are not normally printed. A text shelf contains both the text and the attributes pertaining thereto and is a permanent part of the document but cannot be referenced as are other IIBs 86. A Text Shelf Block may be referenced only through the Named Item Index 607 and no SI 84 exists for Text Shelf Blocks. As previously mentioned, a FRSN (appearing in FIG. 610 as (f)) is associated with each text shelf 633 in NIX 607.

d. Note Blocks

A Note Block contains the text and any applicable attributes of notes appearing in the document and a single note may be comprised of several chained Note Blocks.

e. Free Form Region and Equation Blocks

A Free Form Region of a document may contain any non-wordwrapped text or any graphic that can be entered through KB 46 and any attributes applicable thereto. Every space in a Free Form Region is defined. that is, it does not contain any 'white space', and graphics and text may be entered at any point in the region. Examples of Free Form Regions include scientific equations and charts. Free Form Region Blocks may be chained to create as large a Free Form Region as required. An Equation Block is similar to a Free Form Region Block, or a Graphics Block, but is particularly designated to contain information in the form of equations.

f. Footnote Blocks

A Footnote Block contains the text and applicable attributes of a footnote and a single footnote may be comprised of chained Footnote Blocks.

g. Header/Footer Blocks

Headers and Footers are restricted attributes, that is, they can be placed only at the top of a page, immediately after the format line.

There are three types of Headers and Footers. A Primary Header/Footer is printed on every page of the document, a First Alternate Header/Footer is printed on every other page, and a Second Alternate is printed on the pages interleaved with the pages having First Alternate Header/Footers.

Headers and Footers contain options which may pertain to specific Headers and Footers, such as print styles, lines printed on, and page numbering. The Header area of a Header/Footer Block contains unique information pertaining to these options.

h. Matrix Element Text Blocks

A matrix is a two dimensional table, or array, of areas of wordwrapped text with each such area being referred to as a cell. The text and attributes of a single such cell are contained in a corresponding Matrix Element Block, a type of IIB 86.

Format lines defining the columns of the matrix are contained in Format IIB 86s are are treated as elements of the matrix. The first element of a matrix column is always a format line, there is always a format line for each column of a matrix and a format line may be referenced by any number of Matrix Element Blocks. This restriction on the assignment of format lines, that is, one for each column, allows the columns and rows of the matrix to be easily rotated or interchanged. The text within a cell is unique in that it cannot be modified by any other format line than that appearing with reference to the column containing the cell.

The Matrix Element Blocks and Format Blocks of a particular matrix are located through a Matrix Description Table, which also contains the definition of the matrix. Matrix Description Tables are in turn located through Primary and Secondary Matrix Indexes.

A Matrix Description Table has the same structure as the blocks previously described and contains, as described, the information necessary to completely define a matrix. The Data area contains FRSNs pointing to the text blocks and format lines of the matrix with each FRSN pointing to the beginning of a Matrix Element Block, the smallest unit of a matrix. In addition to the standard information, the Header area identifies the number of rows and columns of the matrix.

Each Matrix Element Block contains normal word-wrapped text and any applicable attributes of a cell of the matrix and are referenced in the Matrix Description Table in row order from left to right.

i. Picture Blocks

A Picture Block contains the name of a file containing, in turn, a graphic, that is, picture and may contain additional information identifying the area of the document to be occupied by the picture. As previously described, Picture Blocks will normally be used with system having bit mapped display and printing capabilities.

j. Voice Blocks

Voice Blocks may contain the names of files containing voice messages, for example, in Digital Voice Store and Forward (DVX) systems.

k. External Data

External Data Blocks may contain the names of files external to the system which contain programs or data operating upon data within the system or used by the system. The provision of External Data Blocks allows, for example, programs residing in external files to be overlayed to operate upon data within a file in the document. External data may also be incorporated into a document through an attribute reference, as described below.

l. Merge Data Blocks

A Merge Data Block is a chain of text which contain encoded instructions for performing merge operations between an external text source and the document. The position of a merge attribute character in a text chain specifies the position at which the merging is to occur. The instructions indicate how to perform the merge operation and there is no restriction on the contents of the merge data chain. Merge data text may contain additional references to other formats, so that columns may be placed in merge chains.

m. Text Insert

A text insert reference is a temporary local reference attribute which does not bear an item number and which consists only of a reference attribute character and a reference word, as described below. The purpose of a Text Insert is to create a forced block break at a point where text is to be inserted.

n. Named Marks

Named Marks are user specified permanent position markers. When applied, the character to be marked is moved to the beginning of a new block and the occurrence of a Named Mark is indicated in the header of the new block, resulting in a forced block break. The block or item number of the new block is then placed in the Named Item Index.

o. Columns: FIG. 10

Parallel columns of text appearing in a document are treated as a special case of normal word-wrapped text. The text in a column consists of a portion of a text page chain containing text, visual attributes, and reference attributes. Each column begins with a format line controlling the display of text therein, and has essentially unlimited length. A column may be interrupted by a format break or page break. A column is terminated by another format, which may in turn contain one or more columns and may be at a page break. It is therefore possible to have, in a single page, a region of three columns followed by a region of two columns, and so on. In addition to format data, columns require block linking pointers (1207, 1209) to connect columns together, if necessary.

Format line and data specifications of columns appearing in a single page are all included into a single format line with multiple codes to delimit the extent of each column.

Column text is stored in a text page chain in sequential form, with the text of the first column (1301) in a multi-column region following immediately after the text of the preceeding region. The last block of text of the preceeding region is chained to the first block of text in the column region, which contain a reference (1201) to the formats for the column regions. The last block of the first column is chained to the first block of the next column (1303), and so on to the end of the column region, wherein the last block of the last column is chained to the next succeeding block.

In order to easily perform whole-column operations, the top blocks of each column n a column region are linked together by side pointers (NC 1207, PC 1209) located in the format attribute words (1201) found at the start of each column. FAW 1201 is shown in FIG. 9.

Having described the various types of IIB 86, the relationship between text and attributes, referred to in the above descriptions, will be described next below.

7. Text and Attributes

As previously described, any IIB 86 may contain, in the Data area, both text and attributes. Attributes, which appear as words written in the lower part of the block Data area may, as previously described, affect the visual appearance of the text, may be descriptive in indicating that a character is to be optionally printed or is to be used in generating a table of contents or an index, or may contain information pertaining to the text, for example, footnotes.

Visual and descriptive attributes are always applied to a range of characters, which may be as short as one character. There may be a number of distinct visual/descriptive attributes appearing in a single block. If the same visual or descriptive attribute is applied to characters separated by at least one characters, two attributes will be present., if, however, the same attribute is applied to consecutive characters, a single attribute will result.

Informational attributes usually appear as units of text or data existing between two text characters and are referenced or incorporated into the text through a reference to a block containing the infformational text or data.

Attribute words occupy space in an IIB 86 Data area only when defined. In an IIB 86 containing only text with no assigned attributes, therefore, the text may occupy the entire Data area. Conversely, it is possible to have an IIB 86 wherein the entire Data area is occupied by attribute words. Attribute words are defined only within a Text Block and have meaning and are applicable only within the Text Block; attributes cannot span over two or more Text Blocks.

1. Visual/Descriptive Attributes: FIG. 8

Visual/Descriptive attributes are applied by the user over a range of characters appearing in the text, from one character to all characters appearing in the Text Block. Whether or not certain visual attributes are displayable, depends upon the capabilities of Display 48.

A visual/descriptive attribute word will contain information (TY 1103) identifying whether the attribute is visual or informational, the position (SO 1107) of the first character in the Text Block affected by the attribute, and the position (ED 1109)of the last character in the Text Block, affected by the attribute. Also included is information (DATA 1105) identifying the attribute to be applied. Only one attribute is specified by each attribute word and, if text characters have more than one visual attribute, multiple attribute words are required.

Attributes implemented in the present embodiment of the document structure include, but are not limited to, the following:

| | |
|---|---|
| Underline | Color Change |
| Double Underline | Revision Mark |
| Superscript | Subscript |
| Bold | Table of Contents Mark |
| Font Change | Index/Occurrence Mark |
| Merge | Hyphen |
| Character Set Change | Table of Contents |
| No Break | Strike-Through |
| Optional Text | Index Generation |

2. Informational Attributes: FIG. 8

As described above, informational attributes are units of text of data that exist between two text characters. Informational attributes are represented by a unique, unprintable character (AC 623, shown in FIG. 6) and by informational attribute words (IAW 1115) appearing in the attribute area of the Text Block Data area. Only one informational attribute may be associated with the informational character in a single occurrence of the informational character and each informational word may define only one informational attribute.

The data associated with the information character is, for each occurrence, kept in IIB 86s and are located through the Indexing Blocks through their Item Numbers.

An informational attribute word contains information (TY 1103) identifying the word as referring to an informational attribute, the type of attribute (AUX 1117), and the Item Number (1121) of the attribute. The word also contains information (AC OFF 1119) identifying the location within the text where the informational attribute takes effect and, in the case of, fof example. Picture or Free Form Regions, may identify the horizontal and vertical space required in the document for the attribute (DATA 1123).

The forms of informational attribute implemented in the present embodiment include, but are not limited to:

| | |
|---|---|
| Format References | Matrix References |
| Note References | Picture References |
| Free Form Region References | Voice References |
| Footnote References | External Data References |

3. Attribute Sorting Order

The attribute words stored in the attribute area of a Text Block are maintained in a specific order to provide ready and logical access to the words while fetching characters and associated attributes. If two or more attributes begin or are located at the same point in the text, their order is determined first by attribute type, that is, reference attributes, such as informational attributes, will occur prior to visual or descriptive attributes.

The invention described above may be embodied in yet other specific forms without departing from the spirit or essential characteristics thereof. For example, the system described herein may be implemented in a centralized document processing system or in a system wherein independent processors or computers are located separate from and receive document and routine information from a central memory or other computer system. Such downloading of data and routines may occur as a single operation rather than as an interactive downloading of currently active routines and document segments. In further example, the document structure described above may be implemented in any form of document processing system, whether distributed or centralized or the system may be implemented with additional of less editing capabilities. Thus, the present embodiments are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. In a document processing system including processing means and storage means a method for generating a document in the processing means and storing the document in the storage means comprising the steps of:
   generating and storing a document table for storing pointers by means of which the processing means locates a plurality of indexes including pointers;
   generating adaptive indexing block means locatable by the pointers in the document table for storing the indexes;
   receiving information to be incorporated into the document in the processing means;
   generating an information item block means for the received information;
   copying the received information into the generated information item block means;
   placing a pointer by means of which the processing means locates the generated information item block means in an index of the plurality of indexes according to the function of the received information in the document; and storing the information item block means and the adaptive indexing block means.

2. The method of claim 1, wherein for certain of the indexes, each index is contained in a single secondary indexing block means as long as the number of pointers in the index is less than or equal to a maximum number N of pointers and the step of placing a pointer further comprises the steps of:

determining the number of pointers in the index;

if the number is N or an integer multiple thereof, performing the step of generating an additional secondary indexing block means;

if the number is N, performing the steps of generating a primary indexing block means and arranging the primary indexing block means and the secondary indexing block means in the index so that the pointer for the index in the document table locates the primary indexing block means, and a pointer in the primary indexing block means locates the secondary indexing block means;

if the number is an integer multiple of N, performing the steps of generating an additional secondary indexing block means and placing the pointer to the additional secondary indexing block means in the primary indexing block means; and if the number is greater than or equal to N, performing the step of placing the pointer in the additional secondary index block means.

3. The method of claim 1 wherein the information item block means include means for storing chaining pointers;

each information item block means has one of a plurality of types according to its function in the document;

for certain information item block means, the step of generating the information item block means includes the step of storing chaining pointers chaining the information item block means to another information item block means having the same type.

4. The method of claim 2 and wherein:

each of the secondary index block means includes storage for chaining pointers and the step of generating an additional secondary indexing block means includes the step of storing chaining pointers chaining the additional secondary indexing block to the existing secondary indexing block means.

5. In the method of claim 1, further comprising the step of:

generating an information item number and associating the item number with an information item block means so that the information item block means associated with the item number may be located in a certain index by means of the item number.

6. In the method of claim 1 and wherein:

the step of generating a document table includes the step of placing a pointer to a named item index of the plurality of indexes therein;

the step of generating adaptive index block means includes the step of generating adaptive index block means for storing the named item index; and the method further includes the steps of associating a name with an information item block means and placing the name and a pointer permitting location of the associated information block means in the adaptive index block means for storing the named item index.

7. The method of claim 1 wherein:

the step of receiving information includes receiving text for the document;

When the received information is text, the step of copying the received information includes the steps of writing the text into text storage means in the text information item block means and writing attributes pertaining to the text in the text storage means into attribute storage means in the text information item block means.

8. In the method of claim 7 wherein the step of writing attributes includes the step of writing visual attribute words defining the visual appearance of the text, each visual attribute word pertaining to one visual attribute and including information identifying the position of the first text character in the range of text stored in the text storage means affected by the visual attribute, information identifying the position of the last text character in the range, and information identifying the visual attribute.

9. In the method of claim 7 wherein the step of writing text into the text storage means includes the step of writing a unique non-text character indicating the location at which an informational attribute applies into the text storage means and the step of writing attributes includes the step of writing an information attribute word representing the informational attribute and corresponding to the unique non-text character and including information identifying the position within the text to which the informational attribute applies and an item number and the step of associating the item number with an information item block containing the information pertaining to the information attribute with the information item block means so that the information item block means associated with the item number may be located in a certain index by means of the item number.

* * * * *